United States Patent
Trabelsi

(10) Patent No.: US 11,104,843 B2
(45) Date of Patent: Aug. 31, 2021

(54) WELL TREATMENT COMPOSITIONS AND METHODS COMPRISING CERTAIN MICROEMULSIONS AND CERTAIN CLAY CONTROL ADDITIVES EXHIBITING SYNERGISTIC EFFECT OF ENHANCING CLAY SWELLING PROTECTION AND PERSISTENCY

(71) Applicant: Flotek Chemistry, LLC, Houston, TX (US)

(72) Inventor: Siwar Trabelsi, Houston, TX (US)

(73) Assignee: Flotek Chemistry, LLC, Houston, TX (US)

(\*) Notice: Subject to any disclaimer, the term of this patent is extended or adjusted under 35 U.S.C. 154(b) by 0 days.

(21) Appl. No.: 16/598,989

(22) Filed: Oct. 10, 2019

(65) Prior Publication Data

US 2021/0108132 A1    Apr. 15, 2021

(51) Int. Cl.
*E21B 41/00* (2006.01)
*C09K 8/82* (2006.01)
(Continued)

(52) U.S. Cl.
CPC ............ *C09K 8/82* (2013.01); *C09K 8/035* (2013.01); *C09K 8/584* (2013.01); *C09K 8/588* (2013.01);
(Continued)

(58) Field of Classification Search
None
See application file for complete search history.

(56) References Cited

U.S. PATENT DOCUMENTS 3,060,210 A    4/1961    De Groote
3,047,062 A    7/1962    Meadors
(Continued)

FOREIGN PATENT DOCUMENTS

CN    102127414 A    7/2011
CN    102277143 B    3/2013
(Continued)

OTHER PUBLICATIONS

[No Author Listed], The HLB system: a time-saving guide to emulsifier selection. ICI Americas Inc. 1976. 22 pages.
(Continued)

*Primary Examiner* — Andrew Sue-Ako
(74) *Attorney, Agent, or Firm* — Wolf, Greenfield & Sacks, P.C.

(57) ABSTRACT

Compositions and methods comprising certain microemulsions and certain clay control additives for enhancing clay swelling protection and persistency in treating swelling clay of a subterranean formation of oil and/or gas wells are generally provided. The combination of certain microemulsions and certain clay control additives exhibit synergistic effects by enhancing clay swelling protection and persistency in treating swelling clay. The well treatment composition may use up to four times less concentration of clay control additive compared to using the same clay control additive alone, while still providing the same, similar, or higher degree of clay swelling protection and enhanced persistency. The microemulsion and the clay control additive may be added to a carrier fluid to form the well treatment
(Continued)

composition, which is injected into the subterranean formation to provide enhanced clay swelling protection and persistency of continuing to provide clay swelling protection for a longer period of time during flowback.

20 Claims, 1 Drawing Sheet

(51) Int. Cl.
  *C09K 8/60* (2006.01)
  *C09K 8/584* (2006.01)
  *C09K 8/035* (2006.01)
  *C09K 8/588* (2006.01)
(52) U.S. Cl.
  CPC ............. *C09K 8/604* (2013.01); *C09K 8/608* (2013.01); *E21B 41/00* (2013.01); *C09K 2208/12* (2013.01)

(56) References Cited

U.S. PATENT DOCUMENTS

| | | | |
|---|---|---|---|
| 3,347,789 A | 10/1967 | Dickson et al. | |
| 3,368,624 A | 2/1968 | Heuer et al. | |
| 3,483,923 A | 12/1969 | Darley | |
| 3,710,865 A | 1/1973 | Kiel | |
| 3,756,319 A | 9/1973 | Holm et al. | |
| 3,760,881 A | 9/1973 | Kiel | |
| 3,850,248 A | 11/1974 | Carney | |
| 3,919,411 A | 11/1975 | Glass et al. | |
| 4,005,020 A | 1/1977 | McCormick | |
| 4,206,809 A | 6/1980 | Jones | |
| 4,233,165 A | 11/1980 | Salathiel et al. | |
| 4,276,935 A | 7/1981 | Hessert et al. | |
| 4,360,061 A | 11/1982 | Canter et al. | |
| 4,414,128 A | 11/1983 | Goffinet | |
| 4,472,291 A | 9/1984 | Rosano | |
| 4,511,488 A | 4/1985 | Matta | |
| 4,650,000 A | 3/1987 | Andreasson et al. | |
| 4,844,756 A | 7/1989 | Forsberg | |
| 5,008,026 A | 4/1991 | Gardner et al. | |
| 5,034,140 A | 7/1991 | Gardner et al. | |
| 5,076,954 A | 12/1991 | Loth et al. | |
| 5,083,613 A | 1/1992 | Gregoli et al. | |
| 5,095,989 A | 3/1992 | Prukop | |
| 5,217,531 A | 6/1993 | Cheung | |
| 5,247,995 A | 9/1993 | Tjon-Joe-Pin et al. | |
| 5,310,002 A | 5/1994 | Blauch et al. | |
| 5,356,482 A | 10/1994 | Mehta et al. | |
| 5,567,675 A | 10/1996 | Romocki | |
| 5,587,354 A | 12/1996 | Duncan, Jr. | |
| 5,587,357 A | 12/1996 | Rhinesmith | |
| 5,604,195 A | 2/1997 | Misselyn et al. | |
| 5,652,200 A | 7/1997 | Davies et al. | |
| 5,665,689 A | 9/1997 | Durbut | |
| 5,676,763 A | 10/1997 | Salisbury et al. | |
| 5,697,458 A | 12/1997 | Carney | |
| 5,707,940 A | 1/1998 | Bush et al. | |
| 5,762,138 A | 6/1998 | Ford et al. | |
| 5,784,386 A | 7/1998 | Norris | |
| 5,811,383 A | 9/1998 | Klier et al. | |
| 5,830,831 A | 11/1998 | Chan et al. | |
| 5,874,386 A | 2/1999 | Chan et al. | |
| 5,925,233 A | 7/1999 | Miller et al. | |
| 5,975,206 A | 11/1999 | Woo et al. | |
| 5,977,032 A | 11/1999 | Chan | |
| 5,990,072 A | 11/1999 | Gross et al. | |
| 5,996,692 A | 12/1999 | Chan et al. | |
| 6,046,140 A | 4/2000 | Woo et al. | |
| 6,090,754 A | 7/2000 | Chan et al. | |
| 6,110,885 A | 8/2000 | Chan | |
| 6,112,814 A | 9/2000 | Chan et al. | |
| 6,165,946 A | 12/2000 | Mueller et al. | |
| 6,173,776 B1 | 1/2001 | Furman et al. | |
| 6,191,090 B1 | 2/2001 | Mondin et al. | |
| 6,228,830 B1 | 5/2001 | Vlasblom | |
| 6,260,621 B1 | 7/2001 | Furman et al. | |
| 6,302,209 B1 | 10/2001 | Thompson, Sr. et al. | |
| 6,364,020 B1 | 4/2002 | Crawshaw et al. | |
| 6,486,115 B1 | 11/2002 | Weaver et al. | |
| 6,581,687 B2 | 6/2003 | Collins et al. | |
| 6,593,279 B2 | 7/2003 | Von Krosigk et al. | |
| 6,613,720 B1 | 9/2003 | Feraud et al. | |
| 6,729,402 B2 | 5/2004 | Chang et al. | |
| 6,770,603 B1 | 8/2004 | Sawdon et al. | |
| 6,793,025 B2 | 9/2004 | Patel et al. | |
| 6,800,593 B2 | 10/2004 | Dobson, Jr. et al. | |
| 6,818,595 B2 | 11/2004 | Benton et al. | |
| 6,911,417 B2 | 6/2005 | Chan et al. | |
| 6,914,040 B2 | 7/2005 | Deak et al. | |
| 6,921,742 B2 * | 7/2005 | Smith ...................... | C09K 8/04 507/103 |
| 6,939,832 B2 | 9/2005 | Collins | |
| 6,984,610 B2 | 1/2006 | VonKrosigk et al. | |
| 7,021,378 B2 | 4/2006 | Prukop | |
| 7,122,509 B2 | 10/2006 | Sanner et al. | |
| 7,134,496 B2 | 11/2006 | Jones et al. | |
| 7,205,262 B2 | 4/2007 | Schwartz et al. | |
| 7,205,264 B2 | 4/2007 | Boles | |
| 7,231,976 B2 | 6/2007 | Berry et al. | |
| 7,380,606 B2 | 6/2008 | Pursley et al. | |
| 7,392,844 B2 | 7/2008 | Berry et al. | |
| 7,407,915 B2 | 8/2008 | Jones et al. | |
| 7,468,402 B2 | 12/2008 | Yang et al. | |
| 7,481,273 B2 | 1/2009 | Javora et al. | |
| 7,514,390 B2 | 4/2009 | Chan | |
| 7,514,391 B2 | 4/2009 | Chan | |
| 7,533,723 B2 | 5/2009 | Hughes et al. | |
| 7,543,644 B2 | 6/2009 | Huang et al. | |
| 7,543,646 B2 | 6/2009 | Huang et al. | |
| 7,544,639 B2 | 6/2009 | Pursley et al. | |
| 7,547,665 B2 | 6/2009 | Welton et al. | |
| 7,552,771 B2 | 6/2009 | Eoff et al. | |
| 7,559,369 B2 | 7/2009 | Roddy et al. | |
| 7,581,594 B2 | 9/2009 | Tang | |
| 7,615,516 B2 | 11/2009 | Yang et al. | |
| 7,621,334 B2 | 11/2009 | Welton et al. | |
| 7,622,436 B2 | 11/2009 | Tuzi et al. | |
| 7,655,603 B2 | 2/2010 | Crews | |
| 7,677,311 B2 | 3/2010 | Abad et al. | |
| 7,687,439 B2 | 3/2010 | Jones et al. | |
| 7,709,421 B2 | 5/2010 | Jones et al. | |
| 7,712,534 B2 | 5/2010 | Bryant et al. | |
| 7,727,936 B2 | 6/2010 | Pauls et al. | |
| 7,727,937 B2 | 6/2010 | Pauls et al. | |
| 7,730,958 B2 | 6/2010 | Smith | |
| 7,825,073 B2 | 11/2010 | Welton et al. | |
| 7,833,943 B2 | 11/2010 | Van Zanten et al. | |
| 7,838,467 B2 | 11/2010 | Jones et al. | |
| 7,846,877 B1 | 12/2010 | Robb | |
| 7,851,414 B2 | 12/2010 | Yang et al. | |
| 7,855,168 B2 | 12/2010 | Fuller et al. | |
| 7,857,051 B2 | 12/2010 | Abad et al. | |
| 7,886,824 B2 | 2/2011 | Kakadjian et al. | |
| 7,893,010 B2 | 2/2011 | Ali et al. | |
| 7,902,123 B2 | 3/2011 | Harrison et al. | |
| 7,906,464 B2 | 3/2011 | Davidson | |
| 7,910,524 B2 | 3/2011 | Welton et al. | |
| 7,931,088 B2 | 4/2011 | Stegemoeller et al. | |
| 7,960,314 B2 | 6/2011 | Van Zanten et al. | |
| 7,960,315 B2 | 6/2011 | Welton et al. | |
| 7,963,720 B2 | 6/2011 | Hoag et al. | |
| 7,971,659 B2 | 7/2011 | Gatlin et al. | |
| 7,976,241 B2 | 7/2011 | Hoag et al. | |
| 7,989,404 B2 | 8/2011 | Kakadjian et al. | |
| 7,992,656 B2 | 8/2011 | Dusterhoft et al. | |
| 7,998,911 B1 | 8/2011 | Berger et al. | |
| 8,043,996 B2 | 10/2011 | Harris | |
| 8,053,396 B2 | 11/2011 | Huff et al. | |
| 8,053,397 B2 | 11/2011 | Huang et al. | |
| 8,057,682 B2 | 11/2011 | Hoag et al. | |
| 8,091,644 B2 | 1/2012 | Clark et al. | |
| 8,091,645 B2 | 1/2012 | Quintero et al. | |

(56) References Cited

U.S. PATENT DOCUMENTS

| | | |
|---|---|---|
| 8,091,646 B2 | 1/2012 | Quintero et al. |
| 8,100,190 B2 | 1/2012 | Weaver et al. |
| 8,148,303 B2 | 4/2012 | Van Zanten et al. |
| 8,183,182 B2 | 5/2012 | Oliveira et al. |
| 8,206,062 B2 | 6/2012 | Hoag et al. |
| 8,207,096 B2 | 6/2012 | van Zanten et al. |
| 8,210,263 B2 | 7/2012 | Quintero et al. |
| 8,220,546 B2 | 7/2012 | Kakadjian et al. |
| 8,227,382 B2 | 7/2012 | Dakin et al. |
| 8,231,947 B2 | 7/2012 | Vaidya et al. |
| 8,235,120 B2 | 8/2012 | Quintero et al. |
| 8,242,059 B2 | 8/2012 | Sawdon |
| 8,293,687 B2 | 10/2012 | Giffin |
| 8,342,241 B2 | 1/2013 | Hartshorne et al. |
| 8,349,771 B2 | 1/2013 | Seth et al. |
| 8,356,667 B2 | 1/2013 | Quintero et al. |
| 8,357,639 B2 | 1/2013 | Quintero et al. |
| 8,372,789 B2 | 2/2013 | Harris et al. |
| 8,383,560 B2 | 2/2013 | Pich et al. |
| 8,403,051 B2 | 3/2013 | Huang et al. |
| 8,404,623 B2 | 3/2013 | Robb et al. |
| 8,413,721 B2 | 4/2013 | Welton et al. |
| 8,415,279 B2 | 4/2013 | Quintero et al. |
| 8,431,620 B2 | 4/2013 | Del Gaudio et al. |
| 8,453,741 B2 | 6/2013 | van Zanten |
| 8,499,832 B2 | 8/2013 | Crews et al. |
| 8,517,100 B2 | 8/2013 | Ali et al. |
| 8,517,104 B2 | 8/2013 | Kieffer |
| 8,524,643 B2 | 9/2013 | Huff et al. |
| 8,551,926 B2 | 10/2013 | Huang et al. |
| 8,592,350 B2 | 11/2013 | van Zanten et al. |
| 8,684,079 B2 | 4/2014 | Wattenbarger et al. |
| 8,778,850 B2 | 7/2014 | Andrecola |
| 8,865,632 B1 | 10/2014 | Parnell et al. |
| 8,916,508 B2 | 12/2014 | Parnell et al. |
| 9,068,108 B2 | 6/2015 | Hill et al. |
| 9,200,192 B2 | 12/2015 | Zelenev et al. |
| 9,222,013 B1 | 12/2015 | Champagne et al. |
| 9,321,955 B2 | 4/2016 | Hill et al. |
| 9,428,683 B2 | 8/2016 | Hill et al. |
| 9,464,223 B2 | 10/2016 | Champagne et al. |
| 9,505,970 B2 | 11/2016 | Vaughn et al. |
| 9,790,414 B2 | 10/2017 | Champagne et al. |
| 9,809,741 B2 | 11/2017 | Hill et al. |
| 9,850,418 B2 | 12/2017 | Champagne et al. |
| 9,868,893 B2 | 1/2018 | Saboowala et al. |
| 9,884,988 B2 | 2/2018 | Dismuke et al. |
| 9,890,624 B2 | 2/2018 | Portwood |
| 9,890,625 B2 | 2/2018 | Portwood et al. |
| 9,951,264 B2 | 4/2018 | Penny et al. |
| 9,957,779 B2 | 5/2018 | Fursdon-Welsh et al. |
| 9,994,762 B2 | 6/2018 | Hill et al. |
| 10,000,693 B2 | 6/2018 | Hill et al. |
| 10,005,948 B2 | 6/2018 | Champagne et al. |
| 10,053,619 B2 | 8/2018 | Saboowala et al. |
| 10,087,361 B2 | 10/2018 | Hill et al. |
| 10,144,862 B2 | 12/2018 | Zelenev et al. |
| 10,196,557 B2 | 2/2019 | Hill et al. |
| 10,280,360 B2 | 5/2019 | Champagne et al. |
| 10,287,483 B2 | 5/2019 | Saboowala et al. |
| 10,294,757 B2 | 5/2019 | Fursdon-Welsh et al. |
| 10,294,764 B2 | 5/2019 | Champagne et al. |
| 10,308,859 B2 | 6/2019 | Champagne et al. |
| 10,421,707 B2 | 9/2019 | Trabelsi et al. |
| 2001/0007663 A1 | 7/2001 | Von Corswant |
| 2003/0022944 A1 | 1/2003 | Gumkowski et al. |
| 2003/0069143 A1 | 4/2003 | Collins |
| 2003/0232095 A1 | 12/2003 | Garti et al. |
| 2006/0014648 A1 | 1/2006 | Milson et al. |
| 2006/0211593 A1 | 9/2006 | Smith et al. |
| 2006/0258541 A1 | 11/2006 | Crews |
| 2007/0123445 A1 | 5/2007 | Tuzi et al. |
| 2007/0293404 A1 | 12/2007 | Hutchins et al. |
| 2007/0295368 A1 | 12/2007 | Harrison et al. |
| 2008/0274918 A1 | 11/2008 | Quintero et al. |
| 2008/0287324 A1 | 11/2008 | Pursley et al. |
| 2009/0078415 A1 | 3/2009 | Fan et al. |
| 2009/0137432 A1 | 5/2009 | Sullivan et al. |
| 2009/0159288 A1 | 6/2009 | Horvath Szabo et al. |
| 2009/0221456 A1 | 9/2009 | Harrison et al. |
| 2009/0260819 A1 | 10/2009 | Kurian et al. |
| 2009/0275488 A1 | 11/2009 | Zamora et al. |
| 2009/0281004 A1 | 11/2009 | Ali et al. |
| 2010/0022421 A1 | 1/2010 | Gutierrez et al. |
| 2010/0173805 A1 | 7/2010 | Pomerleau |
| 2010/0216670 A1 | 8/2010 | Del Gaudio et al. |
| 2010/0243248 A1 | 9/2010 | Golomb et al. |
| 2010/0252267 A1 | 10/2010 | Harris et al. |
| 2010/0263863 A1 | 10/2010 | Quintero et al. |
| 2010/0272765 A1 | 10/2010 | Ho O et al. |
| 2010/0307757 A1 | 12/2010 | Blow et al. |
| 2011/0021386 A1 | 1/2011 | Ali et al. |
| 2011/0136706 A1 | 6/2011 | Carroll et al. |
| 2011/0146983 A1 | 6/2011 | Sawdon |
| 2011/0190174 A1 | 8/2011 | Weerasooriya et al. |
| 2011/0220353 A1 | 9/2011 | Bittner et al. |
| 2011/0237467 A1 | 9/2011 | Cornette et al. |
| 2011/0253365 A1 | 10/2011 | Crews et al. |
| 2011/0290491 A1 | 12/2011 | Gupta et al. |
| 2012/0004146 A1 | 1/2012 | Van Zanten et al. |
| 2012/0015852 A1 | 1/2012 | Quintero et al. |
| 2012/0071366 A1 | 3/2012 | Falana et al. |
| 2012/0080232 A1 | 4/2012 | Muller et al. |
| 2012/0129738 A1 | 5/2012 | Gupta et al. |
| 2012/0149626 A1 | 6/2012 | Fluck et al. |
| 2012/0168165 A1 | 7/2012 | Holcomb et al. |
| 2012/0181019 A1 | 7/2012 | Saini et al. |
| 2012/0193095 A1 | 8/2012 | Varadaraj et al. |
| 2012/0208726 A1 | 8/2012 | Smith et al. |
| 2012/0234548 A1 | 9/2012 | Dyer |
| 2012/0241155 A1 | 9/2012 | Ali et al. |
| 2012/0241220 A1 | 9/2012 | Quintero et al. |
| 2012/0255887 A1 | 10/2012 | Holms et al. |
| 2012/0261120 A1 | 10/2012 | Del Gaudio et al. |
| 2012/0285690 A1 | 11/2012 | Weaver et al. |
| 2012/0285694 A1 | 11/2012 | Morvan et al. |
| 2012/0318504 A1 | 12/2012 | Fan et al. |
| 2012/0318515 A1 | 12/2012 | Cawiezel et al. |
| 2012/0322697 A1 | 12/2012 | Zhang |
| 2012/0325492 A1 | 12/2012 | Fefer et al. |
| 2013/0029883 A1 | 1/2013 | Dismuke et al. |
| 2013/0048281 A1 | 2/2013 | Van Zanten et al. |
| 2013/0079255 A1 | 3/2013 | Del Gaudio et al. |
| 2013/0109597 A1 | 5/2013 | Sarkar et al. |
| 2013/0133886 A1 | 5/2013 | Quintero |
| 2013/0137611 A1 | 5/2013 | Pierce et al. |
| 2013/0146288 A1 | 6/2013 | Smith et al. |
| 2013/0146545 A1 | 6/2013 | Pabalan et al. |
| 2013/0153232 A1 | 6/2013 | Bobier et al. |
| 2013/0153234 A1 | 6/2013 | Bobier et al. |
| 2013/0192826 A1 | 8/2013 | Kurian et al. |
| 2013/0233559 A1 | 9/2013 | van Zanten et al. |
| 2013/0244913 A1 | 9/2013 | Maberry et al. |
| 2013/0261033 A1 | 10/2013 | Nguyen |
| 2013/0292121 A1 | 11/2013 | Penny et al. |
| 2013/0312977 A1* | 11/2013 | Lembcke .............. E21B 43/121 166/311 |
| 2014/0005079 A1 | 1/2014 | Dahanayake et al. |
| 2014/0110344 A1 | 4/2014 | Hoag et al. |
| 2014/0202700 A1 | 7/2014 | Blair |
| 2014/0262274 A1 | 9/2014 | Dismuke et al. |
| 2014/0262288 A1 | 9/2014 | Penny et al. |
| 2014/0274822 A1 | 9/2014 | Dismuke et al. |
| 2014/0284053 A1* | 9/2014 | Germack ................ C09K 8/36 166/279 |
| 2014/0332212 A1 | 11/2014 | Ayers et al. |
| 2014/0371115 A1 | 12/2014 | Hill et al. |
| 2015/0053404 A1 | 2/2015 | Penny et al. |
| 2015/0105302 A1 | 4/2015 | Pursley et al. |
| 2015/0247082 A1 | 9/2015 | Rea |
| 2015/0247381 A1 | 9/2015 | Pursley |
| 2016/0003018 A1 | 1/2016 | Saboowala et al. |
| 2016/0017204 A1 | 1/2016 | Hill et al. |
| 2016/0024890 A1 | 1/2016 | Fursdon-Welsh et al. |

(56) References Cited

U.S. PATENT DOCUMENTS

| | | |
|---|---|---|
| 2016/0032172 A1 | 2/2016 | Pursley et al. |
| 2016/0075934 A1 | 3/2016 | Champagne et al. |
| 2016/0194550 A1 | 7/2016 | Hill et al. |
| 2016/0257911 A1 | 9/2016 | Denison et al. |
| 2016/0312106 A1 | 10/2016 | Penny et al. |
| 2017/0275518 A1 | 9/2017 | Trabelsi et al. |
| 2017/0313925 A1 | 11/2017 | Dismuke et al. |
| 2017/0368560 A1 | 12/2017 | McElhany et al. |
| 2018/0037792 A1 | 2/2018 | Champagne et al. |
| 2018/0134941 A1 | 5/2018 | Saboowala et al. |
| 2018/0171213 A1 | 6/2018 | Hill et al. |
| 2018/0282611 A1 | 10/2018 | Hill et al. |
| 2018/0305601 A1 | 10/2018 | Champagne et al. |
| 2019/0031948 A1 | 1/2019 | Hill et al. |
| 2019/0055457 A1 | 2/2019 | Smith, Jr. et al. |
| 2019/0055458 A1 | 2/2019 | Smith, Jr. et al. |
| 2019/0055459 A1 | 2/2019 | Zelenev et al. |
| 2019/0085236 A1 | 3/2019 | Saboowala et al. |
| 2019/0090476 A1 | 3/2019 | Smith, Jr. et al. |
| 2019/0100689 A1 | 4/2019 | Zelenev et al. |
| 2019/0169488 A1 | 6/2019 | Hill et al. |
| 2019/0169492 A1 | 6/2019 | Hill et al. |
| 2019/0241796 A1 | 8/2019 | Mast et al. |
| 2019/0264094 A1 | 8/2019 | Hill et al. |
| 2019/0284467 A1 | 9/2019 | Forbes et al. |

FOREIGN PATENT DOCUMENTS

| | | |
|---|---|---|
| CN | 103614128 A | 3/2014 |
| CN | 103642477 A | 3/2014 |
| EP | 1 051 237 B1 | 11/2003 |
| EP | 1 378 554 A1 | 1/2004 |
| EP | 1 786 879 B1 | 2/2012 |
| EP | 2 195 400 B1 | 8/2012 |
| EP | 1 880 081 B1 | 3/2013 |
| GB | 1105975 A | 3/1968 |
| GB | 1177134 A | 1/1970 |
| WO | WO 1999/049182 A1 | 9/1999 |
| WO | WO 2005/048706 A2 | 6/2005 |
| WO | WO 2007/011475 A1 | 1/2007 |
| WO | WO 2012/158645 A1 | 11/2012 |
| WO | WO 2017/099709 A1 | 6/2017 |
| WO | WO 2018/111229 A1 | 6/2018 |
| WO | WO 2018/218177 A1 | 11/2018 |

OTHER PUBLICATIONS

ADM, Evolution Chemicals E5789-117 Description. Jun. 2014. 1 page.

Brost et al., Surfactants assist oil-in-water monitoring by fluroescence. World Oil. Oct. 2008;229(10):12 pages.

Champagne et al., Critical assessment of microemulsion technology for enhancing fluid recovery from tight gas formations and propped fractures. SPE European Formation Damage Conference. Noordwijk, The Netherlands. Jun. 7-10, 2011. SPE-144095. 10 pages.

Crafton et al., Micro-emulsion effectiveness for twenty four wells, Eastern Green River, Wyoming. 2009 SPE Rocky Mountain Petroleum Technology Conference. Denver, Colorado, USA, Apr. 14-16, 2009. SPE-123280. 13 pages.

Haw, The HLB system: a time saving guide to surfactant selection. Presentation to the Midwest chapter of the society of cosmetic chemists. Uniqema. Mar. 9, 2004. 39 slides.

Howard et al., Comparison of flowback aids: understanding their capillary pressure and wetting properties. SPE Production & Operations. Aug. 2010;:376-87.

Kunieda et al. Evaluation of hydrophile-lipophile balance (HLB) of nonionic surfactants. J Colloid and Interface Sci. Sep. 1985;107(1):107-21.

Yang et al., Optimizing nanoemulsions as fluid flowback additives in enhancing tight gas production. J Petroleum Sci Eng. 2014;121:122-5.

Zelenev et al., Microemulsion technology for improved fluid recovery and enhanced core permeability to gas. 2009 SPE European Formation Damage Conference. Scheveningen, The Netherlands. May 27-29, 2009. SPE 122109. 13 pages.

Zelenev et al., Microemulsion-assisted fluid recovery and improved permeability to gas in shale formations. 2010 SPE International Symposium and Exhibition on Formation Damage Control. Lafayette, Louisiana, USA. Feb. 10-12, 2010. SPE 127922. 7 pages.

Zelenev, Surface energy of north American shales and its role in interaction of shale with surfactants and microemulsions. SPE International Symposium on Oilfield Chemistry. The Woodlands, Texas, USA. Apr. 11-13, 2011. SPE-141459. 7 pages.

* cited by examiner

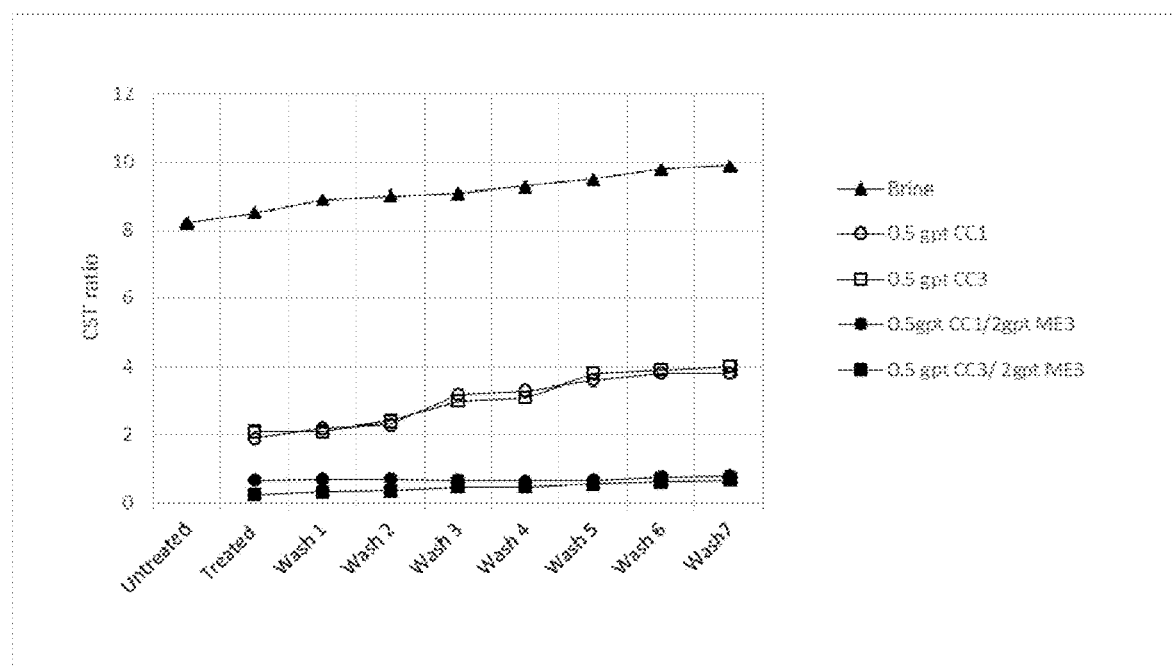

WELL TREATMENT COMPOSITIONS AND METHODS COMPRISING CERTAIN MICROEMULSIONS AND CERTAIN CLAY CONTROL ADDITIVES EXHIBITING SYNERGISTIC EFFECT OF ENHANCING CLAY SWELLING PROTECTION AND PERSISTENCY

TECHNICAL FIELD

Compositions and methods comprising certain microemulsions and certain clay control additives to treat clay present in a subterranean formation of oil and/or gas wells are generally described.

BACKGROUND

The energy shift towards shale gas is a key factor leading to the growth of horizontal (e.g. unconventional) well hydraulic fracturing and hence the fracturing fluid market. The world's fracturing fluids market is expected to triple by the next decade. The oil and gas industry, however, has experienced cost constraints and shrinking margins in recent years, calling for the immediate need for productivity and efficiency improvements. One area that may need productivity and efficiency improvements is in the use of more efficient (e.g., higher performing or better performing) clay control additives for treating the problems associated with clay or clay minerals found in most subterranean formations (sometimes referred to as rock formations).

Most of the subterranean hydrocarbon-bearing shale formations contain large amounts of clay or clay minerals. The presence of clay or clay minerals can cause damage to the subterranean formation during oil and/or gas well treatment operations, which can sometimes result in a significant reduction of oil and/or gas production or even a complete loss of oil and/or gas production. Damage to the subterranean formation, which may also be referred to as subterranean formation damage or formation damage, refers to any process that causes a reduction in the natural inherent productivity of an oil or gas producing formation that tend to decrease pore volume and effective permeability of the producing formation. Damage can occur near the wellbore face or deep into the subterranean formation. In some cases, formation damage may include emulsion and water blocks, asphaltene and paraffin deposition, condensate banking, and fine migration.

The most common problematic clays for the oil and gas industry are kaolinite, illite, chlorite, smectite, and mixed layers of smectite and illite. Clays have a large surface area and contain a significant amount of negatively charged sites which increase their water sensitivity. Clays can be classified as swelling clay or non-swelling clay. Smectite is the only clay that swells by absorbing water between its sheets. Mixed layer clays which comprise smectite and illite may also swell. Kaolinite and illite are classified as non-swelling clays.

When aqueous well treatment fluids are introduced into the subterranean formation, some clays such as smectite can swell, increasing their original volume by several times. The expansion or swelling of the clay is known as clay swelling. When clay swelling occurs, the clay may plug pore throats (sometimes referred to simply as "pores") of reservoir rocks, which adversely prevents or reduces the ability of oil and/or gas to flow out of the formation of the reservoir, thereby reducing hydrocarbon production as well as causing formation damage to the reservoir. Clays, including swelling clays, comprise negatively charged mica-like sheets, which are held together by cations, typically sodium or calcium for example. Upon contact with fresh water or water having a low salinity, these cations are solubilized resulting in the interlayer regions of the clay to expand readily, which promotes instability, resulting in clay swelling. The term clay swelling comprises clays which swell, disperse, disintegrate or otherwise become instable, exhibiting an increase in bulk volume when treated in the presence of aqueous well treatment fluids such as stimulation fluids, drilling fluids, workover fluids etc.

As stated above, clays may have a significant amount of negative charges and may be stabilized by inorganic salts such as potassium chloride (KCl), sodium chloride (NaCl) and ammonium chloride ($NH_4Cl$). Although several inorganic salts can be used, potassium chloride (KCl) is the most commonly used salt in the oil and gas industry and is usually used as a reference to select efficient clay control additives in enhancing clay swelling protection (e.g. in reducing or preventing clay swelling of swelling clays) for clay control treatment operations. In addition to inorganic salts, other clay control additives, such as small molecule quaternary amines (e.g., choline chloride and tetramethyl ammonium chloride), can be used.

Generally, temporary clay control additives (e.g., inorganic salts and/or small molecule quaternary amines) comprise cations, which are contained within the inorganic salt and/or the small molecule quaternary amines, and are attracted to the negative sites to replace the solubilized sodium or calcium cations through cation exchange. Without wishing to be bound by theory, the mechanism of cation exchange restricts the adsorption of additional water between the clay sheets. The cations (e.g., sodium or calcium) are themselves quickly replaced, after, for example: (1) the well treatment is completed; and/or (2) the well is placed into production and the original well treatment fluid is displaced-which may result in clay swelling and eventually damage to the subterranean formation.

Generally, permanent clay control additives such as low molecular weight, cationic polymers, are able to resist removal by subsequent acid treatments and/or flowback. Permanent clay control additives can reduce or prevent clay swelling of swelling clays, because they may contain several cationic sites available in their polymer backbone, which are adsorbed simultaneously to the clay surfaces. The probability of desorption occurring is significantly reduced, hence the permanent clay protection that the clay control additives provide. However, at higher dosages, permanent clay control additives can cause formation damage due to their polymeric nature. Because of the significant amount of bonding on the clay surfaces, permanent clay control additives cannot be removed via cation exchange that occurs with temporary clay control additives.

Microemulsions may also be added to a fracturing fluid, and they are commonly employed in a variety of oil and/or gas well treatment operations related to the extraction of hydrocarbons (e.g., oil and/or gas), such as well stimulation. Low porosity, tight subterranean formations must be stimulated to improve recovery of hydrocarbons from the well. Common stimulation techniques include hydraulic fracturing. Hydraulic fracturing consists of the high pressure injection of a fracturing fluid containing suspended proppant into the wellbore in order to create fractures in the subterranean formation and facilitate production from low permeability zones. All chemical additives pumped downhole in an oil and/or gas well can filter through the reservoir rock and potentially block pore throats, with the possibility of creating formation damage. Fluid invasion may significantly reduce hydrocarbon production from a well. In order to reduce fluid invasion, microemulsions are generally added to the well treatment fluids to help unload the residual aqueous treatment from the formation to increase flowback. As used herein, the term flowback generally refers to the process of allowing fluids to flow from the reservoir after a well treatment.

Microemulsions have several applications in well treatments (e.g., remediation, stimulation, hydraulic fracturing, enhanced oil recovery (EOR) and improved oil recovery (IOR) operations). In a subterranean formation, capillary pressure is equivalent to the pressure required for the hydrocarbon to force water out of the pores of the subterranean formation. Water that remains in the pores near the wellbore forms a water block that may prevent the flow of hydrocarbon into the well. Microemulsions may lower the capillary pressure of the water in the pores of the subterranean formation, which may in turn decrease the formation of undesirable water blocks in the wellbore. It is believed that lower capillary pressure increases flowback, which allows more hydrocarbon to flow freely out of the subterranean formation, which may then be produced and recovered.

While clay control additives and microemulsion additives have been individually explored, the use of these additives in tandem, specifically their synergistic effects, have yet to be fully explored. Accordingly, new compositions and methods are desired.

SUMMARY

The subject matter of the present invention involves, in some cases, interrelated products, alternative solutions to a particular problem, and/or a plurality of different uses of one or more systems and/or articles.

In one aspect, a method of treating a subterranean formation of an oil and/or gas well using a well treatment composition is provided. The method may comprise injecting a well treatment composition into a subterranean formation, the well treatment composition comprising a microemulsion from 75 wt % to 90 wt % versus the total weight of the well treatment composition, wherein the microemulsion comprises an aqueous phase from 10 wt % to 50 wt %, versus the total weight of the microemulsion, a surfactant from 10 wt % to 40 wt %, versus the total weight of the microemulsion, and a solvent from 5 wt % and 25 wt %, versus the total weight of the microemulsion, wherein the solvent is a terpene solvent. The well treatment composition may also comprise a clay control additive from 10 wt % to 25 wt % versus the total weight of the well treatment composition, wherein the clay control additive comprises 30 wt % to 90 wt % water, versus the total weight of the clay control additive, and a clay control compound from 10 wt % to 70 wt %, versus the total weight of the clay control additive, wherein the clay control compound comprises a cationic polymer, and wherein the cationic polymer comprises a polyquaternary amine. In some embodiments, the well treatment composition further comprises a carrier fluid, wherein the microemulsion concentration is from 0.5 gpt (gallons per thousand gallons) to 4.0 gpt of the carrier fluid and a clay control additive concentration is from 0.25 gpt to 2.0 gpt of the carrier fluid. Once injected into the subterranean formation, the method may reduce the swelling of a swelling clay. In some embodiments, the well treatment composition may provide an increase in the persistency of injecting continued clay swelling protection over a longer period of time during and/or after flowback.

In another aspect, a method of treating a subterranean formation of an oil and/or gas well using a well treatment composition is provided. The method may comprise injecting a well treatment composition into a subterranean formation, the well treatment composition comprising a microemulsion from 75 wt % to 90 wt % versus the total weight of the well treatment composition, wherein the microemulsion comprises an aqueous phase from 10 wt % to 50 wt %, versus the total weight of the microemulsion, a cationic surfactant from 10 wt % to 40 wt %, versus the total weight of the microemulsion, and a solvent from 5 wt % and 25 wt %, versus the total weight of the microemulsion, wherein the solvent is a terpene solvent. The well treatment composition may also comprise a clay control additive from 10 wt % to 25 wt % versus the total weight of the well treatment composition, wherein the clay control additive comprises 30 wt % to 90 wt % water, versus the total weight of the clay control additive, and a clay control compound from 10 wt % to 70 wt %, versus the total weight of the clay control additive, wherein the clay control compound comprises a cationic polymer, and wherein the cationic polymer comprises a polyquaternary amine. In some embodiments, the well treatment composition further comprises a carrier fluid, wherein the microemulsion concentration is from 0.5 gpt to 4.0 gpt of the carrier fluid and a clay control additive concentration is from 0.25 gpt to 2.0 gpt of the carrier fluid. Once injected into the subterranean formation, the method may reduce the swelling of a swelling clay.

In yet another aspect, a method of treating a subterranean formation of an oil and/or gas well using a well treatment composition is provided. The method may comprise injecting a well treatment composition into a subterranean formation, the well treatment composition comprising a microemulsion from 75 wt % to 90 wt % versus the total weight of the well treatment composition, wherein the microemulsion comprises an aqueous phase from 10 wt % to 50 wt %, versus the total weight of the microemulsion, a non-ionic surfactant from 10 wt % to 40 wt %, versus the total weight of the microemulsion, and a solvent from 5 wt % and 25 wt %, versus the total weight of the microemulsion, wherein the solvent is a terpene solvent. The well treatment composition may also comprise a clay control additive from 10 wt % to 25 wt % versus the total weight of the well treatment composition, wherein the clay control additive comprises 30 wt % to 90 wt % water, versus the total weight of the clay control additive, and a clay control compound from 10 wt % to 70 wt %, versus the total weight of the clay control additive, wherein the clay control compound comprises a cationic polymer, and wherein the cationic polymer comprises a polyquaternary amine. In some embodiments, the well treatment composition further comprises a carrier fluid, wherein the microemulsion concentration is from 0.5 gpt to 4.0 gpt of the carrier fluid and a clay control additive concentration is from 0.25 gpt to 2.0 gpt of the carrier fluid. Once injected into the subterranean formation, the method may reduce the swelling of a swelling clay.

Other advantages and novel features of the present invention will become apparent from the following detailed description of various non-limiting embodiments of the invention when considered in conjunction with the accompanying FIGURES. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying FIGURES, which are schematic and are not intended to be drawn to scale. In the FIGURES, each identical or nearly identical component illustrated is typically represented by a single numeral. For purposes of clarity, not every component is labeled in every FIGURE, nor is every component of each embodiment of the invention shown where illustration is not necessary to allow those of ordinary skill in the art to understand the invention. In the FIGURES:

FIG. 1 shows the capillary suction timer (CST) ratio measured for brine (the brine comprising 500 parts per million (ppm) TDS ($CaCl_2$) and $NaCl_2$ in a 1:2 ratio by weight), 0.5 gpt of the clay control additives (CC1 and CC3) and the well treatment composition comprising a microemulsion and clay control additives (0.5 gpt CC1 and 2 gpt ME3) and (0.5 gpt CC3 and 2 gpt ME3), at 1 hour after adding the clay control additives and after seven washes by the brine and FIG. 1 also shows the results of persistency tests, according to one set of embodiments.

DETAILED DESCRIPTION

This invention relates to well treatment compositions and methods of using the well treatment compositions, comprising certain microemulsions in conjunction with certain clay control additives, to treat clay swelling in subterranean formations of oil and/or gas wells containing clay or clay minerals. In some embodiments, the well treatment composition may be used to reduce swelling of a swelling clay, such as smectite or mixed layers of smectite and illite, that may be present in the subterranean formation or rock formation. The choice of both the clay control additive and the microemulsion strongly depends on the type and the amount of swelling clay present in the subterranean formation (sometimes referred to as the rock formation).

The unique combination of certain microemulsions and certain clay control additives produces a surprising, synergistic effect that has not been known in the industry. The synergistic effect of these two components of the well treatment composition, provides at least two synergistic benefits: (1) increase in clay control performance by providing enhanced clay swelling protection (e.g., significantly reduces or prevents clay swelling of swelling clays), when compared to the use of the same clay control additive alone (i.e. use of the well treatment composition without the microemulsion component); and (2) increase in the persistency of clay swelling protection for a longer period of time (e.g. during flowback) as provided by the well treatment composition by reducing the susceptibility of the well treatment composition from washing away, when compared to using the same clay control additive alone (i.e. use of the well treatment composition without the microemulsion component). As a result of the synergistic benefits described above, the concentration of clay control additive in the inventive well treatment composition can be reduced by up to four times, when compared to using the same clay control additive alone (i.e. use of the well treatment composition without the microemulsion)—while still achieving the same, a similar, or a higher degree of clay control performance of reducing or preventing clay swelling of swelling clays (e.g. providing clay swelling protection) and while providing higher persistency in clay control treatment (e.g. providing continued clay swelling protection over a longer period of time, such as during flowback) as provided by the well treatment composition.

The use of up to four times less concentration of clay control additive in the well treatment composition, when compared to the use of the same clay control additive alone (i.e. use of the well treatment composition without the microemulsion) results in at least two advantages: (1) a substantial decrease in the cost of clay control additives that would otherwise be necessary due to less concentration of clay control used; and (2) produces less damage to the subterranean formation as a result of less concentration of clay control additive that would otherwise be needed.

As discussed above, the well treatment composition, comprising certain microemulsions and certain clay control additives, shows an increase in persistency of providing continued clay swelling protection (e.g. continued reduction of clay swelling of swelling clay) over a longer period of time as provided by the well treatment composition for clay control treatment, during and/or after flowback. After the well treatment is completed and the well is placed into production and the well treatment fluid is displaced, a persistent clay control treatment will continue to provide over a longer period of time, clay swelling protection (e.g. substantially reduce or prevent clay swelling of swelling clay), because of its permanent nature, which allows the well treatment to remain on the surface of the rock formation in the subterranean formation and continue to perform its function at reducing clay swelling of clay or clay minerals. The well treatment composition, comprising certain microemulsions and certain clay control additives, is significantly superior when compared to using the same clay control additive alone (i.e. using the well treatment composition without the microemulsion).

The concentration of certain clay control additives used in conjunction with certain microemulsions can be substantially reduced compared to the concentration used for the same clay control additive alone. For example, a service company tasked with performing clay control treatment operations may typically inject 2 gpt (i.e. 2 gallons of clay control additive per thousand gallons of carrier fluid) to treat the subterranean formation for clay swelling. However, by using the inventive well treatment composition (which comprises a certain microemulsion), it is possible for the service company to use as little as 0.5 gpt of the same clay control additive within the well treatment—which equates to a use concentration of four times less clay control additive. The use of substantially smaller concentration (up to four times less) of clay control additive is highly desirable for cost reduction purposes for an operator. In addition, by using substantially smaller concentration of clay control additives to treat clay swelling of swelling clays, the operator produces less damage to the subterranean formation.

The combination of certain clay control additives and certain microemulsions significantly enhances clay swelling protection for swelling clays (i.e. substantially reduces or prevents clay swelling) for the formation, thereby reducing the undesirable effect of clays plugging pore throats and causing formation damage. In some embodiments, the efficiency of this combination significantly reduces the amount of clay control concentration by up to four times, by up to three times, or by up to two times, when compared to use of the clay control additive alone (i.e. using the well treatment composition without the microemulsion), while also achieving the same, a similar, or a higher degree of performance of reducing clay swelling. The ability to use significantly less clay control additive in the well provides the advantages of reduction of costs for the operator tremendously as well as produces less damage to the subterranean formation.

Clay control protection (also known as clay control stabilization) can be temporary or permanent depending on the clay control composition used to treat the subterranean formation. A temporary clay control additive has a temporary effect, whereby the clay control additive can be easily removed (e.g. washed away) during flowback. In contrast, a permanent clay control additive has higher persistency in the subterranean formation, meaning that it provides higher persistent clay swelling protection (e.g. continued clay swelling protection by reducing clay swelling for a longer period of time for swelling clays) on the rock surfaces of the subterranean formation, because it is more resistance to removal during flowback. Thus, another advantage of using this well treatment composition of certain clay control additives and certain microemulsions is in the composition's ability to provide permanent (i.e. persistent) clay stabilization, even after being exposed and re-exposed to flowback, including water or diluted brines.

In some embodiments, the well treatment composition can be pumped (e.g injected) in the field as part of a treatment fluid to enhance the recovery of hydrocarbon fluids produced from a hydrocarbon-bearing subterranean formation.

The well treatment composition may further comprise a conventional fracturing fluid, a remediation fluid, a drilling fluid, and an acidizing fluid. The amount of clay control additive in the well treatment composition is typically between from about 0.25 gallons per thousand gallons of carrier fluid to about 5 gallons per thousand gallons of carrier fluid, depending of the application.

Microemulsion

The well treatment composition comprises a microemulsion. The microemulsion comprises an aqueous phase, a non-aqueous phase (e.g. a solvent), and a surfactant. In some embodiments, the microemulsion may further comprise an alcohol and/or a co-solvent. In some embodiments, the microemulsion further comprises additional additives.

In some embodiments, the microemulsion comprises from 60 wt % to 95 wt % versus the total weight of the well treatment composition, from 65 wt % to 90 wt % versus the total weight of the well treatment composition, from 70 wt % to 85 wt % versus the total weight of the well treatment composition, from 70 wt % to 80 wt % versus the total weight of the well treatment composition, from 75 wt % to 90 wt % versus the total weight of the well treatment composition, from 80 wt % to 90 wt % versus the total weight of the well treatment composition, or from 85 wt % to 95 wt % versus the total weight of the well treatment composition.

Details of each of the components of the microemulsion are described in detail below.

Aqueous Phase

The microemulsion may comprise an aqueous phase. The aqueous phase generally comprises water or is water. The water may be provided from any suitable source (e.g., sea water, fresh water, deionized water, reverse osmosis water, water from field operations and production, well water, or plant water). The aqueous phase may also comprise dissolved salts. Non-limiting examples of dissolved salts include salts comprising K, Na, Br, Cr, Cs, or Bi, for example, halides of these metals, including NaCl, KCl, CaCl$_2$), and MgCl and combinations thereof.

The aqueous phase may make up any suitable amount of the microemulsion by weight. The aqueous phase may make up greater than or equal to 1 wt %, greater than or equal to 2 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 35 wt %, greater than or equal to 40 wt %, greater than or equal to 45 wt %, greater than or equal to 50 wt %, greater than or equal to 55 wt %, or greater than or equal to 60 wt % of the total weight of the microemulsion composition. The aqueous phase may make up less than or equal to 60 wt %, less than or equal to 55 wt %, less than or equal to 50 wt %, less than or equal to 45 wt %, less than or equal to 40 wt %, less than or equal to 35 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 2 wt %, or less than or equal to 1 wt % of the total weight of the microemulsion. Combinations of the above-referenced ranges are also possible (e.g., greater than or equal to 1 wt % and less than or equal to 60 wt % of the total weight of the microemulsion, greater than or equal to 15 wt % and less than or equal to 30 wt % of the total weight of the microemulsion, greater than or equal to 20 wt % and less than or equal to 25 wt % of the total weight of the microemulsion, greater than or equal to 10 wt % and less than or equal to 60 wt %, or greater than or equal to 10 wt % and less than 50 wt %). Other ranges are also possible.

Non-Aqueous Phase

The microemulsion may comprise a non-aqueous phase. The non-aqueous phase may comprise a solvent and/or a combination of solvents (e.g., in the form of a solvent blend). The non-aqueous phase may make up any suitable amount of the microemulsion by weight. The non-aqueous phase may make up greater than or equal to 1 wt %, greater than or equal to 2 wt %, greater than or equal to 3 wt %, greater than or equal to 4 wt %, greater than or equal to 5 wt %, greater than or equal to 10 wt %, greater than or equal to 15 wt %, greater than or equal to 20 wt %, greater than or equal to 25 wt %, or greater than or equal to 30 wt % of the total weight of the microemulsion. The non-aqueous phase may make up less than or equal to 30 wt % of the microemulsion, less than or equal to 25 wt % of the microemulsion, less than or equal to 20 wt % of the microemulsion, less than or equal to 15 wt % of the microemulsion, less than or equal to 10 wt % of the microemulsion, less than or equal to 5 wt % of the microemulsion, less than or equal to 4 wt %, less than or equal to 3 wt %, less than or equal to 2 wt %, or less than or equal to 1 wt % of the total weight of the microemulsion. Combinations of the above-referenced ranges are also possible (e.g., greater than or equal to 1 wt % and less than or equal to 30 wt % of the microemulsion, greater than or equal to 5 wt % and less than or equal to 25 wt %, greater than or equal to 15 wt % and less than or equal to 30 wt % of the microemulsion, or greater than or equal to 20 wt % and less than or equal to 25 wt % of the total weight of the microemulsion).

Terpene Solvents

In some embodiments, a non-aqueous phase of a microemulsion comprises a terpene solvent. In some embodiments, the non-aqueous phase comprises a terpene solvent and another different type of solvent (e.g., an alcohol and/or a glycol). In some embodiments, the non-aqueous phase comprises a first terpene solvent and a second, different type of terpene solvent.

Terpene solvents are generally derived biosynthetically from units of isoprene. Terpene solvents may be generally classified as monoterpenes (e.g. having two isoprene units), sesquiterpenes (e.g. having three isoprene units), diterpenes, or the like. The term "terpenoid" includes natural degradation products, such as ionones, and natural and synthetic derivatives, for example, terpene alcohols, ethers, aldehydes, ketones, acids, esters, epoxides, and hydrogenation products (see Ullmann's Encyclopedia of Industrial Chemistry, 2012, pages 29-45, herein incorporated by reference).

In some embodiments, the terpene is a naturally occurring terpene. In some embodiments, the terpene is a non-naturally occurring terpene and/or a chemically modified terpene (e.g., saturated terpene, terpene amine, fluorinated terpene, or silylated terpene). Terpenes that are modified chemically, such as by oxidation or rearrangement of the carbon skeleton, may be referred to as terpenoids. Many references use "terpene" and "terpenoid" interchangeably, and this disclosure will adhere to that usage.

In some embodiments, the terpene solvent is a non-oxygenated terpene solvent. In some embodiments, the terpene solvent is a citrus terpene. In some embodiments, the terpene solvent is d-limonene. In some embodiments, the terpene solvent is dipentene. In some embodiments, the terpene solvent is selected from the group consisting of d-limonene, nopol, alpha terpineol, eucalyptol, dipentene, linalool, pinene, alpha-pinene, beta-pinene, alpha-terpinene, geraniol, alpha-terpinyl acetate, menthol, menthone, cineole, citranellol, and combinations thereof. As used herein, "terpene" refers to a single terpene compound or a blend of terpene compounds.

In some embodiments, the terpene solvent is an oxygenated terpene. Non-limiting examples of oxygenated terpenes include terpenes containing alcohol, aldehyde, ether, or ketone groups. In some embodiments, the terpene comprises an ether-oxygen, for example, eucalyptol, or a carbonyl oxygen, for example, menthone. In some embodiments the terpene solvent comprises a terpene alcohol. Non-limiting examples of terpene alcohols include linalool, geraniol, nopol, α-terpineol, and menthol. Non-limiting examples of oxygenated terpenes include eucalyptol, 1, 8-cineol, menthone, and carvone.

Alkyl Aliphatic Carboxylic Acid Ester Solvents

In some embodiments, a non-aqueous phase of a microemulsion comprises an alkyl aliphatic carboxylic acid ester solvent. As used herein "alkyl aliphatic carboxylic acid ester" refers to a compound or a blend of compounds having the general formula:

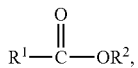

wherein $R^1$ is a $C_4$ to $C_{22}$ optionally substituted aliphatic group, including those bearing heteroatom-containing substituent groups, and $R^2$ is a $C_1$ to $C_6$ alkyl group. In some embodiments, $R^1$ is $C_4$ to $C_{22}$ alkyl. In some embodiments, $R^1$ is substituted with at least one heteroatom-containing substituent group. For example, wherein a blend of compounds is provided and each $R^2$ is $—CH_3$ and each $R^1$ is independently a $C_4$ to $C_{22}$ aliphatic group, the blend of compounds is referred to as methyl aliphatic carboxylic acid esters, or methyl esters. In some embodiments, such alkyl aliphatic carboxylic acid esters may be derived from a fully synthetic process or from natural products, and thus comprise a blend of more than one ester. In some embodiments, the alkyl aliphatic carboxylic acid ester comprises butyl 3-hydroxybutyrate, isopropyl 3-hydroxybutyrate, hexyl 3-hydroxylbutyrate, and combinations thereof.

Non-limiting examples of alkyl aliphatic carboxylic acid esters include methyl octanoate, methyl decanoate, a blend of methyl octanoate and methyl decanoate, and butyl 3-hydroxybutyrate.

Alkane Solvents

In some embodiments, a non-aqueous phase of a microemulsion comprises an unsubstituted cyclic or acyclic, branched or unbranched alkane solvent. In some embodiments, the cyclic or acyclic, branched or unbranched alkane solvent has from 6 to 22 carbon atoms (e.g. from 6 to 10 carbon atoms). When the cyclic or acyclic alkane solvent is branched, the branches may include 1 carbon atom (e.g., in the case of methylated cyclic or acyclic alkane solvents), 2 carbon atoms (e.g., in the case of ethylated cyclic or acyclic alkane solvents), 3 carbon atoms (e.g., in the case of propylated cyclic or acyclic alkane solvents), or more carbon atoms. Non-limiting examples of unsubstituted, acyclic, unbranched alkanes include hexane, heptane, octane, nonane, decane, undecane, dodecane, and combinations thereof. Non-limiting examples of unsubstituted, acyclic, branched alkanes include isomers of methylpentane (e.g., 2-methylpentane, 3-methylpentane), isomers of dimethylbutane (e.g., 2,2-dimethylbutane, 2,3-dimethylbutane), isomers of methylhexane (e.g., 2-methylhexane, 3-methylhexane), isomers of ethylpentane (e.g., 3-ethylpentane), isomers of dimethylpentane (e.g., 2,2-dimethylpentane, 2,3-dimethylpentane, 2,4-dimethylpentane, 3,3-dimethylpentane), isomers of trimethylbutane (e.g., 2,2,3-trimethylbutane), isomers of methylheptane (e.g., 2-methylheptane, 3-methylheptane, 4-methylheptane), isomers of dimethylhexane (e.g., 2,2-dimethylhexane, 2,3-dimethylhexane, 2,4-dimethylhexane, 2,5-dimethylhexane, 3,3-dimethylhexane, 3,4-dimethylhexane), isomers of ethylhexane (e.g. 3-ethylhexane), isomers of trimethylpentane (e.g., 2,2,3-trimethylpentane, 2,2,4-trimethylpentane, 2,3,3-trimethylpentane, 2,3,4-trimethylpentane), isomers of ethylmethylpentane (e.g., 3-ethyl-2-methylpentane, 3-ethyl-3-methylpentane), and combinations thereof. Non-limiting examples of unsubstituted cyclic branched or unbranched alkanes include cyclohexane, methylcyclopentane, ethylcyclobutane, propylcyclopropane, isopropylcyclopropane, dimethylcyclobutane, cycloheptane, methylcyclohexane, dimethylcyclopentane, ethylcyclopentane, trimethylcyclobutane, cyclooctane, methylcycloheptane, dimethylcyclohexane, ethylcyclohexane, isopropylcyclohexane, cyclononane, methylcyclooctane, dimethylcycloheptane, ethylcycloheptane, trimethylcyclohexane, ethylmethylcyclohexane, propylcyclohexane, cyclodecane, and combinations thereof. In some embodiments, the unsubstituted cyclic or acyclic, branched or unbranched alkane having from 6 to 12 carbon atoms is selected from the group consisting of heptane, octane, nonane, decane, 2,2,4-trimethylpentane (isooctane), and propylcyclohexane, and combinations thereof.

Unsaturated Hydrocarbon Solvents

In some embodiments, a non-aqueous phase of a microemulsion comprises a solvent that is an unsubstituted acyclic branched alkene or unsubstituted acyclic unbranched alkene having one or two double bonds and from 6 to 22 carbon atoms. In some embodiments, the non-aqueous phase comprises an unsubstituted acyclic branched alkene or unsubstituted acyclic unbranched alkene having one or two double bonds and from 6 to 22 carbon atoms. Non-limiting examples of unsubstituted acyclic unbranched alkenes having one or two double bonds and from 6 to 22 carbon atoms include isomers of hexene (e.g., 1-hexene, 2-hexene), isomers of hexadiene (e.g., 1,3-hexadiene, 1,4-hexadiene), isomers of heptene (e.g., 1-heptene, 2-heptene, 3-heptene), isomers of heptadiene (e.g., 1,5-heptadiene, 1-6, heptadiene), isomers of octene (e.g., 1-octene, 2-octene, 3-octene), isomers of octadiene (e.g., 1,7-octadiene), isomers of nonene, isomers of nonadiene, isomers of decene, isomers of decadiene, isomers of undecene, isomers of undecadiene, isomers of dodecene, isomers of dodecadiene, and combinations thereof. In some embodiments, the acyclic, unbranched alkene having one or two double bonds and from 6 to 12 carbon atoms is an alpha-olefin (e.g., 1-hexene, 1-heptene, 1-octene, 1-nonene, 1-decene, 1-undecene, 1-dodecene). Non-limiting examples of unsubstituted, acyclic, branched alkenes include isomers of methylpentene, isomers of dimethylpentene, isomers of ethylpentene, isomers of methylethylpentene, isomers of propylpentene, isomers of methylhexene, isomers of ethylhexene, isomers of dimethylhexene, isomers of methylethylhexene, isomers of methylheptene, isomers of ethylheptene, isomers of dimethylhexptene, isomers of methylethylheptene, and combinations thereof. In a particular embodiment, the unsubstituted, acyclic, unbranched alkene having one or two double bonds and from 6 to 12 carbon atoms is 1-octene, 1,7-octadiene, or a combination thereof.

Aromatic Solvents

In some embodiments, a non-aqueous phase of a microemulsion comprises an aromatic solvent having a boiling point from 300 to 400° F. Non-limiting examples of aromatic solvents having a boiling point from 300 to 400° F. include butylbenzene, hexylbenzene, mesitylene, light aromatic naphtha, heavy aromatic naphtha, and combinations thereof.

In some embodiments, a non-aqueous phase of a microemulsion comprises an aromatic solvent having a boiling point from 175 to 300° F. Non-limiting examples of aromatic liquid solvents having a boiling point from 175 to 300° F. include benzene, xylenes, and toluene.

In a particular embodiment, the non-aqueous phase does not comprise toluene or benzene.

Dialkyl Ether Solvents

In some embodiments, a non-aqueous phase of a microemulsion comprises a solvent that is a branched or unbranched dialkylether having the formula $C_nH_{2n+1}OC_mH_{2m+1}$ wherein n+m is from 6 to 22. In some embodiments, n+m is from 6 to 12, or from 6 to 10, or from 6 to 8. Non-limiting examples of branched or unbranched dialkylether compounds having the formula $C_nH_{2n+1}OC_mH_{2m+1}$ include isomers of $C_3H_7OC_3H_7$, isomers of $C_4H_9OC_3H_7$, isomers of $C_5H_{11}OC_3H_7$, isomers of $C_6H_{13}OC_3H_7$, isomers of $C_4H_9OC_4H_9$, isomers of $C_4H_9OC_5H_{11}$, isomers of $C_4H_9OC_6H_{13}$, isomers of $C_5H_{11}OC_6H_{13}$, and isomers of $C_6H_{13}OC_6H_{13}$. In a particular embodiment, the branched or unbranched dialkylether is an isomer of $C_6H_{13}OC_6H_{13}$ (e.g. dihexylether).

Bicyclic Hydrocarbon Solvents

In some embodiments, a non-aqueous phase of a microemulsion comprises a bicyclic hydrocarbon solvent with varying degrees of unsaturation including fused, bridgehead, and spirocyclic compounds. Non-limiting examples of bicyclic solvents include isomers of decalin, tetrahydronaphthalene, norbornane, norbornene, bicyclo[4.2.0]octane, bicyclo[3.2.1]octane, spiro[5.5]dodecane, and combinations thereof.

Amine Solvents

In some embodiments, a non-aqueous phase of a microemulsion comprises a solvent that is an amine of the formula $NR^1R^2R^3$, wherein $R^1$, $R^2$, and $R^3$ are the same or different and are $C_{1-16}$ alkyl groups that are (i) branched or unbranched; (ii) cyclic or acyclic; and (iii) substituted or unsubstituted. In some embodiments any two of $R^1$, $R^2$, and $R^3$ are joined together to form a ring. In some embodiments, each of $R^1$, $R^2$, and $R^3$ are the same or different and are hydrogen or alkyl groups that are (i) branched or unbranched; (ii) cyclic or acyclic; and (iii) substituted or unsubstituted. In some embodiments, any two of $R^1$, $R^2$, and $R^3$ are joined together to form a ring, provided at least one of $R^1$, $R^2$, and $R^3$ is a methyl or an ethyl group. In some embodiments, $R^1$ is $C_1$-$C_6$ alkyl group that is (i) branched or unbranched; (ii) cyclic or acyclic; and (iii) substituted or unsubstituted and $R^2$ and $R^3$ are hydrogen or a $C_{8-16}$ alkyl group that is (i) branched or unbranched; (ii) cyclic or acyclic; and (iii) substituted or unsubstituted. In some embodiments, $R^2$ and $R^3$ may be joined together to form a ring. In some embodiments, $R^1$ is a methyl or an ethyl group and $R^2$ and $R^3$ are the same or different and are $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ is a methyl group and $R^2$ and $R^3$ are the same or different and are hydrogen or $C_{8-16}$ alkyl groups that are (i) branched or unbranched; (ii) cyclic or acyclic; and (iii) substituted or unsubstituted. In some embodiments $R^2$ and $R^3$ may be joined together to form a ring. In some embodiments, $R^1$ and $R^2$ are the same or different and are hydrogen or $C_1$-$C_6$ alkyl groups that are (i) branched or unbranched; (ii) cyclic or acyclic; and (iii) substituted or unsubstituted and $R^3$ is a $C_{8-16}$ alkyl group that is (i) branched or unbranched; (ii) cyclic or acyclic; and (iii) substituted or unsubstituted. In some embodiments, $R^1$ and $R^2$ are the same or different and are a methyl or an ethyl group and $R^3$ is hydrogen or a $C_{1-6}$ alkyl group that is (i) branched or unbranched; (ii) cyclic or acyclic; and (iii) substituted or unsubstituted. In some embodiments, $R^1$ and $R^2$ are methyl groups and $R^3$ is hydrogen or a $C_{8-16}$ alkyl group that is (i) branched or unbranched; (ii) cyclic or acyclic; and (iii) substituted or unsubstituted.

In some embodiments, the amine is of the formula $NR^1R^2R^3$, wherein $R^1$ is methyl and $R^2$ and $R^3$ are $C_{8-16}$ alkyl groups that are (i) branched or unbranched; (ii) cyclic or acyclic; and (iii) substituted or unsubstituted. In some embodiments $R^2$ and $R^3$ are joined together to form a ring. Non-limiting examples of amines include isomers of N-methyl-octylamine, isomers of N-methyl-nonylamine, isomers of N-methyl-decylamine, isomers of N-methylundecylamine, isomers of N-methyldodecylamine, isomers of N-methyl teradecylamine, isomers of N-methyl-hexadecylamine, and combinations thereof. In some embodiments, the amine is N-methyl-decylamine, N-methyl-hexadecylamine, or a combination thereof.

In some embodiments, the amine is of the formula $NR^1R^2R^3$, wherein $R^1$ is a methyl group and $R^2$ and $R^3$ are the same or different and are $C_{1-6}$ alkyl groups that are (i) branched or unbranched; (ii) cyclic or acyclic; and (iii) substituted or unsubstituted.

In some embodiments $R^2$ and $R^3$ are joined together to form a ring. Non-limiting examples of amines include isomers of N-methyl-N-octyloctylamine, isomers of N-methyl-N-nonylnonylamine, isomers of N-methyl-N-decyldecylamine, isomers of N-methyl-N-undecylundecylamine, isomers of N-methyl-N-dodecyldodecylamine, isomers of N-methyl-N-tetradecylteradecylamine, isomers of N-methyl-N-hexadecylhexadecylamine, isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the amine is selected from the group consisting of N-methyl-N-octyloctylamine, isomers of N-methyl-N-nonylnonylamine, isomers of N-methyl N-decyldecylamine, isomers of N-methyl-N-undecylundecylamine, isomers of N-methyl-N-dodecyldodecylamine, isomers of N-methyl-N-tetradecylteradecylamine, and isomers of N-methyl-N-hexadecylhexadecylamine, and combinations thereof. In some embodiments, the amine is N-methyl-N-dodecyldodecylamine, one or more isomers of N-methyl-N-hexadecylhexadecylamine, or combinations thereof. In some embodiments, the amine is selected from the group consisting of isomers of N-methyl-N-octylnonylamine, isomers of N-methyl-N-octyldecylamine, isomers of N-methyl-N-octyldodecylamine, isomers of N-methyl-N-octylundecylamine, isomers of N-methyl-N-octyltetradecylamine, isomers of N-methyl-N-octylhexadecylamine, N-methyl-N-nonyldecylamine, isomers of N-methyl-N-nonyldodecylamine, isomers of N-methyl-N-nonyltetradecylamine, isomers of N-methyl-N-nonylhexadecylamine, isomers of N-methyl-N-decyldodecylamine, isomers of N-methyl-N-decylundecylamine, isomers of N-methyl-N-decyldodecylamine, isomers of N-methyl-N-decyltetradecylamine, isomers of N-methyl-N-decylhexadecylamine, isomers of N-methyl-N-dodecylundecylamine, isomers of N-methyl-N-dodecyltetradecylamine, isomers of N-methyl-N-dodecylhexadecylamine, isomers of N-methyl-N-tetradecylhexadecylamine, and combinations thereof. In some embodiments, the cyclic or acyclic, branched or unbranched tri-substituted amine is selected from the group consisting of N-methyl-N-octyldodecylamine, N-methyl-N-octylhexadecylamine, and N-methyl-N-dodecylhexadecylamine, and combinations thereof.

In some embodiments, the amine is of the formula $NR^1R^2R^3$, wherein $R^1$ and $R^2$ are methyl and $R^3$ is a $C_{8-16}$ alkyl that is (i) branched or unbranched; (ii) cyclic or acyclic; and (iii) substituted or unsubstituted. Non-limiting examples of amines include isomers of N,N-dimethylnonylamine, isomers of N,N-dimethyldecylamine, isomers of N,N-dimethylundecylamine, isomers of N,N-dimethyldodecylamine, isomers of N,N-dimethyltetradecylamine, and isomers of N,N-dimethylhexadecylamine. In some embodiments, the amine is selected from the group consisting of N,N-dimethyldecylamine, isomers of N,N-dodecylamine, and isomers of N,N-dimethylhexadecylamine.

Amide Solvents

In some embodiments, a non-aqueous phase of a microemulsion comprises an amide solvent. In some embodiments, the amide is of the formula $N(C=OR^4)R^5R^6$, wherein $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, each of $R^4$, $R^5$, and $R^6$ are the same or different and are hydrogen or $C_{4-16}$ alkyl groups wherein the alkyl groups are (i) branched or unbranched; (ii) cyclic or acyclic; and (iii) substituted or unsubstituted, provided at least one of $R^4$, $R^5$, and $R^6$ is a methyl or an ethyl group. In some embodiments $R^5$ and $R^6$ are joined together to form a ring. In some embodiments, $R^4$ is hydrogen, $C_1$-$C_6$ alkyl, wherein the alkyl group is (i) branched or unbranched; (ii) cyclic or acyclic; and (iii) substituted or unsubstituted, and $R^5$ and $R^6$ are the same or different and are hydrogen or $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen, methyl, or ethyl and $R^5$ and $R^6$ are $C_{8-16}$ alkyl groups wherein the alkyl groups are (i) branched or unbranched; (ii) cyclic or acyclic; and (iii) substituted or unsubstituted. In some embodiments, $R^5$ and $R^6$ are joined together to form a ring. In some embodiments, $R^4$ is hydrogen and $R^5$ and $R^6$ are the same or different and are $C_{8-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, $R^4$ and $R^5$ are the same or different and are hydrogen or $C_1$-$C_6$ alkyl groups wherein the alkyl groups are (i) branched or unbranched; (ii) cyclic or acyclic; and (iii) substituted or unsubstituted and $R^6$ is a $C_{8-16}$ alkyl group that is (i) branched or unbranched; (ii) cyclic or acyclic; and (iii) substituted or unsubstituted. In some embodiments, $R^4$ and $R^5$ are the same or different and are independently hydrogen, methyl, or ethyl and $R^6$ is a $C_{8-16}$ alkyl group that is (i) branched or unbranched; (ii) cyclic or acyclic; and (iii) substituted or unsubstituted. In some embodiments, $R^4$ and $R^5$ are hydrogen and $R^6$ is a $C_{8-16}$ alkyl group that is (i) branched or unbranched; (ii) cyclic or acyclic; and (iii) substituted or unsubstituted. In some embodiments, $R^6$ is hydrogen or $R^6$ is a $C_{1-6}$ alkyl group that is (i) branched or unbranched; (ii) cyclic or acyclic; and (iii) substituted or unsubstituted and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen, methyl, or ethyl and $R^4$ and $R^5$ are the same or different and are $C_{8-16}$ alkyl groups wherein the alkyl groups are (i) branched or unbranched; (ii) cyclic or acyclic; and (iii) substituted or unsubstituted. In some embodiments, $R^6$ is hydrogen and $R^4$ and $R^5$ are the same or different and are $C_{8-6}$ alkyl groups wherein the alkyl groups are (i) branched or unbranched; (ii) cyclic or acyclic; and (iii) substituted or unsubstituted. In some embodiments, $R^5$ and $R^6$ are the same or different and are hydrogen or $C_{1-6}$ alkyl groups wherein the alkyl groups are (i) branched or unbranched; (ii) cyclic or acyclic; and (iii) substituted or unsubstituted, and $R^4$ is a $C_{8-16}$ alkyl group that is (i) branched or unbranched; (ii) cyclic or acyclic; and (iii) substituted or unsubstituted. In some embodiments, $R^5$ and $R^6$ are the same or different and are independently hydrogen, methyl, or ethyl and $R^4$ is a $C_{8-16}$ alkyl group that is (i) branched or unbranched; (ii) cyclic or acyclic; and (iii) substituted or unsubstituted. In some embodiments, $R^5$ and $R^6$ are hydrogen and $R^4$ is a $C_{8-16}$ alkyl group that is (i) branched or unbranched; (ii) cyclic or acyclic; and (iii) substituted or unsubstituted.

In some embodiments, the amide is of the formula $N(C=OR^4)R^5R^6$, wherein each of $R^4$, $R^5$, and $R^6$ are the same or different and are $C_{4-16}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. In some embodiments, the amide is of the formula $N(C=O R^4)R^5R^6$, wherein each of $R^4$, $R^5$, and $R^6$ are the same or different and are $C_{1-6}$ alkyl groups wherein the alkyl groups are (i) branched or unbranched; (ii) cyclic or acyclic; and (iii) substituted or unsubstituted. In some embodiments $R^5$ and $R^6$ are joined together to form a ring. Non-limiting examples of amides include N,N-dioctyloctamide, N,N-dinonylnonamide, N,N-didecyldecamide, N,N-didodecyldodecamide, N,N-diundecylundecamide, N,N-ditetradecyltetradecamide, N,N-dihexadecylhexadecamide, N,N-didecyloctamide, N,N-didodecyloctamide, N,N-dioctyldodecamide, N,N-didecyldodecamide, N,N-dioctylhexadecamide, N,N-didecylhexadecamide, N,N-didodecylhexadecamide, and combinations thereof. In some embodiments, the amide is N,N-dioctyldodecamide, N,N-didodecyloctamide, or a combination thereof.

In some embodiments, the amide is of the formula N(C=OR$^4$)R$^5$R$^6$, wherein R$^6$ is selected from the group consisting of hydrogen, methyl, ethyl, propyl and isopropyl, and R$^4$ and R$^5$ are the same or different and are C$_{4-16}$ alkyl groups wherein the alkyl groups are (i) branched or unbranched; (ii) cyclic or acyclic; and (iii) substituted or unsubstituted. In some embodiments, R$^6$ is selected from the group consisting of hydrogen, methyl, ethyl, propyl and isopropyl, and R$^4$ and R$^5$ are the same or different and are C$_{4-8}$ alkyl groups wherein the alkyl groups are (i) branched or unbranched; (ii) cyclic or acyclic; and (iii) substituted or unsubstituted. In some embodiments, at least one of R$^4$ and R$^5$ is substituted with a hydroxyl group. In some embodiments, at least one of R$^4$ and R$^5$ is C$_{1-16}$ alkyl substituted with a hydroxyl group.

In some embodiments, the amide is of the formula N(C=OR$^4$)R$^5$R$^6$, wherein R$^6$ is C$_1$-C$_3$ alkyl and R$^4$ and R$^5$ are the same or different and are C$_{4-16}$ alkyl groups that are (i) branched or unbranched; (ii) cyclic or acyclic; and (iii) substituted or unsubstituted. In some embodiments, R$^6$ is selected from the group consisting of methyl, ethyl, propyl, and isopropyl, and R$^4$ and R$^5$ are the same or different and are C$_{4-16}$ alkyl groups that are (i) branched or unbranched; (ii) cyclic or acyclic; and (iii) substituted or unsubstituted. In some embodiments, R$^6$ is selected from the group consisting of methyl, ethyl, propyl, and isopropyl, and R$^4$ and R$^5$ are the same or different and are C$_{8-16}$ alkyl groups that are (i) branched or unbranched; (ii) cyclic or acyclic; and (iii) substituted or unsubstituted. In some embodiments, at least one of R$^4$ and R$^5$ is substituted with a hydroxyl group. In some embodiments, R$^6$ is selected from the group consisting of methyl, ethyl, propyl, and isopropyl, and R$^4$ and R$^5$ are the same or different and are C$_{4-16}$ alkyl groups that are (i) branched or unbranched; (ii) cyclic or acyclic; and (iii) substituted or unsubstituted. In some embodiments at least one of R$^4$ and R$^5$ is C$_{1-16}$ alkyl substituted with a hydroxyl group.

Non-limiting examples of amides include N,N-di-tert-butylformamide, N,N-dipentylformamide, N,N-dihexylformamide, N,N-diheptylformamide, N,N-dioctylformamide, N,N-dinonylformamide, N,N-didecylformamide, N,N-diundecylformamide, N,N-didodecylformamide, N,N-dihydroxymethylformamide, N,N-di-tert-butylacetamide, N,N-dipentylacetamide, N,N-dihexylacetamide, N,N-diheptylacetamide, N,N-dioctylacetamide, N,N-dinonylacetamide, N,N-didecylacetamide, N,N-diundecylacetamide, N,N-didodecylacetamide, N,N-dihydroxymethylacetamide, N,N-dimethylpropionamide, N,N-diethylpropionamide, N,N-dipropylpropionamide, N,N-di-n-propylpropionamide N,N-diisopropylpropionamide, N,N-dibutylpropionamide, N,N-di-n-butylpropionamide, N,N-di-sec-butylpropionamide, N,N-diisobutylpropionamide or N,N-di-tert-butylpropionamide, N,N-dipentylpropionamide, N,N-dihexylpropionamide, N,N-diheptylpropionamide, N,N-dioctylpropionamide, N,N-dinonylpropionamide, N,N-didecylpropionamide, N,N-diundecylpropionamide, N,N-didodecylpropionamide, N,N-dimethyl-n-butyramide, N,N-diethyl-n-butyramide, N,N-dipropyl-n-butyramide, N,N-di-n-propyl-n-butyramide or N,N-diisopropyl-n-butyramide, N,N-dibutyl-n-butyramide, N,N-di-n-butyl-n-butyramide, N,N-di-sec-butyl-n-butyramide, N,N-diisobutyl-n-butyramide, N,N-di-tert-butyl-n-butyramide, N,N-dipentyl-n-butyramide, N,N-dihexyl-n-butyramide, N,N-diheptyl-n-butyramide, N,N-dioctyl-n-butyramide, N,N-dinonyl-n-butyramide, N,N-didecyl-n-butyramide, N,N-diundecyl-n-butyramide, N,N-didodecyl-n-butyramide, N,N-dipentylisobutyramide, N,N-dihexylisobutyramide, N,N-diheptylisobutyramide, N,N-dioctylisobutyramide, N,N-dinonylisobutyramide, N,N-didecylisobutyramide, N,N-diundecylisobutyramide, N,N-didodecylisobutyramide, N,N-pentylhexylformamide, N,N-pentylhexylacetamide, N,N-pentylhexylpropionamide, N,N-pentylhexyl-n-butyramide, N,N-pentylhexylisobutyramide, N,N-methylethylpropionamide, N,N-methyl-n-propylpropionamide, N,N-methylisopropylpropionamide, N,N-methyl-n-butylpropionamide, N,N-methylethyl-n-butyramide, N,N-methyl-n-butyramide, N,N-methylisopropyl-n-butyramide, N,N-methyl-n-butyl-n-butyramide, N,N-methylethylisobutyramide, N,N-methyl-n-propylisobutyramide, N,N-methylisopropylisobutyramide, and N,N-methyl-n-butylisobutyramide. In some embodiments, the amide is selected from the group consisting of N,N-dioctyldodecacetamide, N,N-methyl-N-octylhexadecyldidodecylacetamide, N-methyl-N-hexadecyldodecylhexadecacetamide, and combinations thereof.

In some embodiments, the amide is of the formula N(C=OR$^4$)R$^5$R$^6$, wherein R$^6$ is hydrogen or a methyl group and R$^4$ and R$^5$ are C$_{8-16}$ alkyl groups that are (i) branched or unbranched; (ii) cyclic or acyclic; and (iii) substituted or unsubstituted. Non-limiting amides include isomers of N-methyloctamide, isomers of N-methylnonamide, isomers of N-methyldecamide, isomers of N-methylundecamide, isomers of N methyldodecamide, isomers of N methylteradecamide, and isomers of N-methyl-hexadecamide. In some embodiments, the amides are selected from the group consisting of N-methyloctamide, N-methyldodecamide, N-methylhexadecamide, and combinations thereof.

Non-limiting amides include isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, isomers of N methyl-N-tetradecylhexadecamide, and combinations thereof. In some embodiments, the amide is selected from the group consisting of isomers of N-methyl-N-octyloctamide, isomers of N-methyl-N-nonylnonamide, isomers of N-methyl-N-decyldecamide, isomers of N methyl-N undecylundecamide, isomers of N methyl-N-dodecyldodecamide, isomers of N methyl N-tetradecylteradecamide, isomers of N-methyl-N-hexadecylhdexadecamide, and combinations thereof. In some embodiments, amide is selected from the group consisting of N-methyl-N-octyloctamide, N methyl-N-dodecyldodecamide, and N-methyl-N-hexadecylhexadecamide. In some embodiments, the amide is selected from the group consisting of isomers of N-methyl-N-octylnonamide, isomers of N-methyl-N-octyldecamide, isomers of N-methyl-N-octyldodecamide, isomers of N-methyl-N-octylundecamide, isomers of N-methyl-N-octyltetradecamide, isomers of N-methyl-N-octylhexadecamide, N-methyl-N-nonyldecamide, isomers of N-methyl-N-nonyldodecamide, isomers of N-methyl-N-nonyltetradecamide, isomers of N-methyl-N-nonylhexadecamide, isomers of N-methyl-N-decyldodecamide, isomers of N methyl-N-decylundecamide, isomers of N-methyl-N-decyldodecamide, isomers of N-methyl-N-decyltetradecamide, isomers of N-methyl-N-decylhexadecamide, isomers of N methyl-N-dodecylundecamide, isomers of N methyl-N-dodecyltetradecamide, isomers of N-methyl-N-dodecylhexadecamide, and isomers of N methyl-N-tetradecylhexadecamide. In some embodiments, the amide is selected from the group consisting of N-methyl-N-octyldodecamide, N-methyl-N-octylhexadecamide, and N-methyl-N-dodecylhexadecamide.

In some embodiments, the amide is of the formula $N(C=OR^4)R^5R^6$, wherein $R^5$ and $R^6$ are the same or different and are hydrogen or $C_1$-$C_3$ alkyl groups and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl, and $R^4$ is a $C_{4-16}$ alkyl group that is (i) branched or unbranched; (ii) cyclic or acyclic; and (iii) substituted or unsubstituted. In some embodiments, $R^5$ and $R^6$ are the same or different and are selected from the group consisting of hydrogen, methyl, ethyl, propyl and isopropyl and $R^4$ is a $C_{8-16}$ alkyl group that is (i) branched or unbranched; (ii) cyclic or acyclic; and (iii) substituted or unsubstituted. In some embodiments, $R^4$ is substituted with a hydroxyl group. In some embodiments, $R^5$ and $R^6$ are the same or different and are selected from the group consisting of hydrogen, methyl, ethyl, propyl, and isopropyl, and $R^4$ is selected from the group consisting of tert-butyl and $C_{5-16}$ alkyl groups that are (i) branched or unbranched; (ii) cyclic or acyclic; and (iii) substituted or unsubstituted, and $C_{1-16}$ alkyl groups that are (i) branched or unbranched; (ii) cyclic or acyclic; and (iii) substituted with a hydroxyl group.

In some embodiments, the amide is of the formula $N(C=OR^4)R^5R^6$, wherein $R^5$ and $R^6$ are methyl groups and $R^4$ is a $C_{8-16}$ alkyl group that is (i) branched or unbranched; (ii) cyclic or acyclic; and (iii) substituted or unsubstituted. Non-limiting examples of amides include isomers of N,N-dimethyloctamide, isomers of N,N-dimethylnonamide, isomers of N,N-dimethyldecamide, isomers of N,N-dimethylundecamide, isomers of N,N-dimethyldodecamide, isomers of N,N-dimethyltetradecamide, isomers of N,N-dimethylhexadecamide, and combinations thereof. In some embodiments, the cyclic or acyclic, branched or unbranched trisubstituted amines is selected from the group consisting of N,N-dimethyloctamide, N,N-dodecamide, and N,N-dimethylhexadecamide.

Alcohol Solvents

In some embodiments, a non-aqueous phase of a microemulsion comprises a solvent that is a cyclic or acyclic, branched or unbranched alkane having from 6 to 12 carbon atoms or from 5 to 10 carbon atoms, and substituted with a hydroxyl group. Non-limiting examples of cyclic or acyclic, branched or unbranched alkanes having from 6 to 12 carbon atoms or from 5 to 10 carbon atoms, and substituted with a hydroxyl group include isomers of nonanol, isomers of decanol, isomers of undecanol, isomers of dodecanol, and combinations thereof. In a particular embodiment, the cyclic or acyclic, branched or unbranched alkane having from 9 to 12 carbon atoms and substituted with a hydroxyl group is 1-nonanol, 1-decanol, or a combination thereof.

In some embodiments, the alcohol solvent is selected from primary, secondary, and tertiary alcohols having from 9 to 12 carbon atoms.

Non-limiting examples of cyclic or acyclic, branched or unbranched alkanes having from 5 to 10 carbon atoms, and substituted with a hydroxyl group include isomers of pentanol, isomers of hexanol, and isomers of heptanol.

Non-limiting examples of cyclic or acyclic, branched or unbranched alkanes having 8 carbon atoms and substituted with a hydroxyl group include isomers of octanol (e.g. 1-octanol, 2-octanol, 3-octanol, 4-octanol), isomers of methyl heptanol, isomers of ethylhexanol (e.g. 2-ethyl-1-hexanol, 3-ethyl-1-hexanol, 4-ethyl-1-hexanol), isomers of dimethylhexanol, isomers of propylpentanol, isomers of methylethylpentanol, isomers of trimethylpentanol, and combinations thereof. In a particular embodiment, the cyclic or acyclic, branched or unbranched alkane having 8 carbon atoms and substituted with a hydroxyl group is 1-octanol, 2-ethyl-1-hexanol, or a combination thereof.

Surfactants

A wide variety of suitable surfactants may be employed in the microemulsions described herein, examples of which are provided in further detail below. The surfactant may make up any suitable amount of the microemulsion by weight. The surfactant may make up greater or equal to 10 wt %, greater than or equal to 20 wt %, greater than or equal to 30 wt %, greater than or equal to 40 wt %, greater than or equal to 50 wt %, greater than or equal to 60 wt % of the microemulsion, or greater than or equal to 65 wt % of the total weight of the microemulsion. The surfactant may make up less than or equal to 65 wt %, less than or equal to 60 wt %, less than or equal to 50 wt %, less than or equal to 40 wt %, less than or equal to 30 wt %, less than or equal to 20 wt %, less than or equal to 10 wt %, less than or equal to 5 wt %, less than or equal to 2 wt %, less than or equal to 1 wt %, less than or equal to 0.5 wt %, less than or equal to 0.2 wt %, or less than or equal to 0.1 wt %, of the total weight of the microemulsion. Combinations of the above-referenced ranges are also possible (e.g., greater than or equal to 0.1 wt % and less than or equal to 65 wt %, greater than or equal to 10 wt % and less than or equal to 40 wt %, greater than or equal to 10 wt % and less than or equal to 30 wt %, greater than or equal to 20 wt % and less than or equal to 30 wt %, or greater than or equal to 10 wt % and less than or equal to 50 wt %, of the total weight of the microemulsion).

Non-limiting examples of suitable surfactants include nonionic surfactants with linear or branched structure, including, but not limited to, alkoxylated alcohols, alkoxylated fatty alcohols, alkoxylated castor oils, alkoxylated fatty acids, alkoxylated fatty amines, and alkoxylated fatty amides with a hydrocarbon chain of at least 8 carbon atoms and 5 units or more of alkoxylation. The term alkoxylation includes ethoxylation and propoxylation. Other nonionic surfactants include alkyl glycosides and alkyl glucamides.

It should be understood that a microemulsion may comprise one surfactant, or may comprise two or more surfactants. In some embodiments, a microemulsion may comprise a co-surfactant in addition to one or more surfactants. The term surfactant is given its ordinary meaning in the art and generally refers to compounds having an amphiphilic structure which gives them a specific affinity for oil/water-type and water/oil-type interfaces. In some embodiments, the affinity helps the surfactants to reduce the free energy of these interfaces and to stabilize the dispersed phase of a microemulsion.

The term surfactant includes but is not limited to nonionic surfactants, anionic surfactants, cationic surfactants, amphoteric surfactants, zwitterionic surfactants, switchable surfactants, cleavable surfactants, dimeric or gemini surfactants, glucamide surfactants, alkyl polyglycoside surfactants, extended surfactants containing a nonionic spacer arm central extension and an ionic or nonionic polar group, and combinations thereof. Nonionic surfactants generally do not contain any charges. Anionic surfactants generally possess a net negative charge. Cationic surfactants generally possess a net positive charge. Amphoteric surfactants generally have both positive and negative charges, however, the net charge of the surfactant can be positive, negative, or neutral, depending on the pH of the solution. Zwitterionic surfactants are generally not pH dependent. A zwitterion is a neutral molecule with a positive and a negative electrical charge, though multiple positive and negative charges can be present.

"Extended surfactants" are defined herein to be surfactants having propoxylated/ethoxylated spacer arms. The extended chain surfactants are intramolecular mixtures having at least one hydrophilic portion and at least one lipophilic portion with an intermediate polarity portion in between the hydrophilic portion and the lipophilic portion; the intermediate polarity portion may be referred to as a spacer. They attain high solubilization in the single phase emulsion or microemulsion, and are in some instances, insensitive to temperature and are useful for a wide variety of oil types, such as natural or synthetic polar oil types in a non-limiting embodiment. More information related to extended chain surfactants may be found in U.S. Pat. No. 8,235,120, which is incorporated herein by reference in its entirety.

The term co-surfactant as used herein is given its ordinary meaning in the art and refers to compounds (e.g. pentanol) that act in conjunction with surfactants to form an emulsion or microemulsion.

In some embodiments, the one or more surfactants is a surfactant described in U.S. patent application Ser. No. 14/212,731, filed Mar. 14, 2014, entitled "METHODS AND COMPOSITIONS FOR USE IN OIL AND/OR GAS WELLS," now published as US/2014/0284053 on Sep. 25, 2014, herein incorporated by reference. In some embodiments, the surfactant is a surfactant described in U.S. patent application Ser. No. 14/212,763, filed Mar. 14, 2014, entitled "METHODS AND COMPOSITIONS FOR USE IN OIL AND/OR GAS WELLS," now published as US/2014/0338911 on Nov. 20, 2014 and issued as U.S. Pat. No. 9,884,988 on Feb. 6, 2018, herein incorporated by reference.

In some embodiments, the surfactants described herein in conjunction with solvents, generally form microemulsions that may be diluted to a use concentration to form an oil-in-water nanodroplet dispersion and/or a diluted microemulsion.

In some embodiments, the surfactants generally have hydrophile-lipophile balance (HLB) values from 8 to 18 or from 8 to 14.

Non-limiting examples of different surfactants that may be present in the microemulsion are provided below.

Hydrocarbon Surfactants

In some embodiments, a microemulsion comprises a hydrophilic hydrocarbon surfactant. The hydrophilic hydrocarbon surfactant may comprise an alcohol ethoxylate, wherein the alcohol ethoxylate contains a hydrocarbon group of 10 to 18 carbon atoms or from 12 to 15 carbon atoms, and contains an ethoxylate group of 5 to 12 ethylene oxide units (e.g., 7 ethylene oxide units, 10 ethylene oxide units). Non-limiting examples of suitable alcohol ethoxylates include $C_{12}$-$C_{15}$ $E_7$, $C_{12}$-$C_{15}$ $E_9$, $C_{12}$-$C_{15}$ $E_{12}$, $C_{12}$-$C_{18}$ $E_{10}$, and $C_{12}$ $E_7$.

Nonionic Surfactants

In some embodiments, a microemulsion comprises a nonionic surfactant. In some embodiments, the surfactant is an alkoxylated aliphatic alcohol having from 3 to 40 ethylene oxide (EO) units and from 0 to 20 propylene oxide (PO) units. The term aliphatic alcohol generally refers to a branched or linear, saturated or unsaturated aliphatic moiety having from 6 to 18 carbon atoms.

In some embodiments, a microemulsion comprises a surfactant is selected from the group consisting of ethoxylated fatty acids, ethoxylated fatty amines, and ethoxylated fatty amides wherein the fatty portion is a branched or linear, saturated or unsaturated aliphatic hydrocarbon moiety having from 6 to 18 carbon atoms.

In some embodiments, a microemulsion comprises a surfactant that is an alkoxylated castor oil. In some embodiments, the surfactant is a sorbitan ester derivative. In some embodiments the surfactant is an ethylene oxide-propylene oxide copolymer wherein the total number of ethylene oxide (EO) and propylene oxide (PO) units is from 8 to 40 units. In some embodiments, the surfactant is an alkoxylated tristyryl phenol containing from 6 to 100 total ethylene oxide (EO) and propylene oxide (PO) units (e.g. tristyrylphenol $E_{16}$).

Nonionic Tristyryl Phenol Surfactants

In some embodiments, the surfactant has a structure as in Formula I:

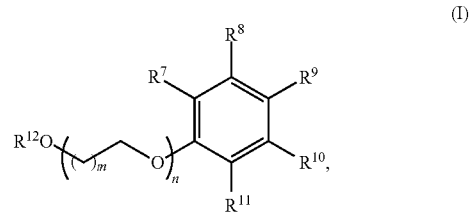

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $R^{12}$ is hydrogen or alkyl, n is 1-100, and each m is independently 1 or 2. In some embodiments, Ar is phenyl. In some embodiments, for a compound of Formula (I), $R^{12}$ is hydrogen or $C_{1-6}$ alkyl. In some embodiments, for a compound of Formula (I), $R^{12}$ is H, methyl, or ethyl. In some embodiments, for a compound of Formula (I), $R^{12}$ is H.

In some embodiments the surfactant of Formula I is a nonionic tristyryl phenol ethoxylate surfactant. In some embodiments, the nonionic tristyryl phenol surfactant comprises a tristyryl phenol ethoxylate containing 10 to 30 ethylene oxide (EO) units. In some embodiments, the nonionic tristyryl phenol surfactant comprises a tristyryl phenol ethoxylate containing 16 ethylene oxide (EO) units.

Amine and Amide Surfactants

In some embodiments, a microemulsion comprises an amine or an amide. Suitable amines include lauryl diethanolamine and lauryl aminopropylamine. Suitable amides include lauryl diethanolamide and lauryl amidopropylamine. In some embodiments, a microemulsion comprises an amine-based surfactant selected from the group consisting of ethoxylated alkylene amines, ethoxylated alkyl amines, propoxylated alkylene amines, propoxylated alkyl amines, ethoxylated-propoxylated alkylene amines and ethoxylated propoxylated alkyl amines. The ethoxylated/propoxylated alkylene or alkyl amine surfactant component preferably includes more than one nitrogen atom per molecule. Suitable amines include ethylenediaminealkoxylate and diethylenetriaminealkoxylate.

Polyimine Surfactants

In some embodiments, a microemulsion comprises a surfactant that is an alkoxylated polyimine with a relative solubility number (RSN) in the range of 5-20. As will be known to those of ordinary skill in the art, RSN values are generally determined by titrating water into a solution of surfactant in 1, 4 dioxane. The RSN values are generally defined as the amount of distilled water necessary to be added to produce persistent turbidity. In some embodiments the surfactant is an alkoxylated novolac resin (also known as a phenolic resin) with a relative solubility number in the range of 5-20. In some embodiments the surfactant is a block copolymer surfactant with a total molecular weight greater than 5,000 g/mol. The block copolymer may have a hydrophobic block that is comprised of a polymer chain that is linear, branched, hyperbranched, dendritic or cyclic.

Glycoside and Glycamide Surfactants

In some embodiments, the microemulsion comprises a surfactant that is an aliphatic polyglycoside having the following formula:

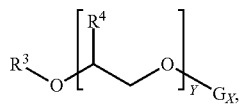

wherein $R^3$ is an aliphatic group having from 6 to 18 carbon atoms; each $R^4$ is independently selected from H, —$CH_3$, or —$CH_2CH_3$; Y is an average number of from 0 to 5; and X is an average degree of polymerization (DP) of from 1 to 4; G is the residue of a reducing saccharide, for example, a glucose residue. In some embodiments, Y is zero.

In some embodiments, a microemulsion comprises a surfactant that is an aliphatic glycamide having the following formula:

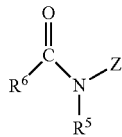

wherein $R^6$ is an aliphatic group having from 6 to 18 carbon atoms; $R^5$ is an alkyl group having from 1 to 6 carbon atoms; and Z is —$CH_2(CH_2OH)_bCH_2OH$, wherein b is from 3 to 5. In some embodiments, $R^5$ is —$CH_3$. In some embodiments, $R^6$ is an alkyl group having from 6 to 18 carbon atoms. In some embodiments, b is 3. In some embodiments, b is 4. In some embodiments, b is 5.

Anionic Surfactants

Suitable anionic surfactants of the microemulsion include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, fatty carboxylates, alkyl sarcosinates, alkyl phosphates and combinations thereof.

In some embodiments, a microemulsion and comprises a surfactant that is an aliphatic sulfate wherein the aliphatic moiety is a branched or linear, saturated or unsaturated aliphatic hydrocarbon moiety having from 6 to 18 carbon atoms. In some embodiments, the surfactant is an aliphatic sulfonate wherein the aliphatic moiety is a branched or linear, saturated or unsaturated aliphatic hydrocarbon moiety having from 6 to 18 carbon atoms.

In some embodiments, a microemulsion comprises a surfactant that is an aliphatic alkoxy sulfate wherein the aliphatic moiety is a branched or linear, saturated or unsaturated aliphatic hydrocarbon moiety having from 6 to 18 carbon atoms and from 4 to 40 total ethylene oxide (EO) and propylene oxide (PO) units.

In some embodiments, a microemulsion comprises a surfactant that is an aliphatic-aromatic sulfate wherein the aliphatic moiety is a branched or linear, saturated or unsaturated aliphatic hydrocarbon moiety having from 6 to 18 carbon atoms. In some embodiments, the surfactant is an aliphatic-aromatic sulfonate wherein the aliphatic moiety is a branched or linear, saturated or unsaturated aliphatic hydrocarbon moiety having from 6 to 18 carbon atoms.

In some embodiments, a microemulsion comprises a surfactant that is an ester or half ester of sulfosuccinic acid with monohydric alcohols.

Anionic Tristyryl Phenol Surfactants

In some embodiments, the surfactant has a structure as in Formula II:

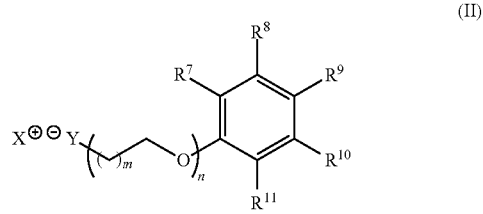

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Y^-$ is an anionic group, $X^+$ is a cationic group, n is 1-100, and each m is independently 1 or 2. In some embodiments, Ar is phenyl. In some embodiments, for a compound of Formula (II), $X^+$ is a metal cation or $N(R^{13})_4$, wherein each $R^{13}$ is independently selected from the group consisting of hydrogen, optionally substituted alkyl, or optionally substituted aryl. In some embodiments, $X^+$ is $NH_4$. Non-limiting examples of metal cations are $Na^+$, $K^+$, $Mg^{+2}$, and $Ca^{+2}$. In some embodiments, for a compound of Formula (II), $Y^-$ is —O—, —$SO_2O^-$, or —$OSO_2O^-$.

Cationic Surfactants

In some embodiments, a microemulsion comprises a cationic surfactant. In some embodiments, the surfactant comprises cationic quaternary ammonium and ethoxylated alcohol. In some embodiments, the surfactant comprises cationic surfactant that is a quaternary alkylammonium salt or a quaternary alkylbenzylammonium salt, cocohydroxyethyl benzyl quaternary, whose alkyl groups have 1 to 24 carbon atoms (e.g., a halide, sulfate, phosphate, acetate, or hydroxide salt). In some embodiments, the surfactant is a quaternary alkylbenzylammonium salt, whose alkyl groups have 1-24 carbon atoms (e.g., a halide, sulfate, phosphate, acetate, or hydroxide salt). In some embodiments, the surfactant is an alkylpyridinium, an alkylimidazolinium, or an alkyloxazolinium salt whose alkyl chain has up to 18 carbons atoms (e.g., a halide, sulfate, phosphate, acetate, or hydroxide salt).

In some embodiments, the cationic surfactant comprises a benzyl coco alkylbis (hydroxyethyl) chloride ethoxylated alcohol.

In some embodiments, a microemulsion comprises a surfactant that is a cationic surfactant such as, monoalkyl quaternary amines, such as cocotrimethylammonium chloride, cetyltrimethylammonium chloride, stearyltrimethylammonium chloride, soyatrimethylammonium chloride, behentrimethylammonium chloride, and the like and mixtures thereof. Other suitable cationic surfactants that may be useful include, but are not necessarily limited to, dialkyl-quaternary amines such as dicetyldimethylammonium chloride, dicocodimethylammonium chloride, distearyldimethylammonium chloride, and the like and mixtures thereof.

Cationic Tristyryl Phenol Surfactants

In some embodiments, the surfactant has a structure as in Formula III:

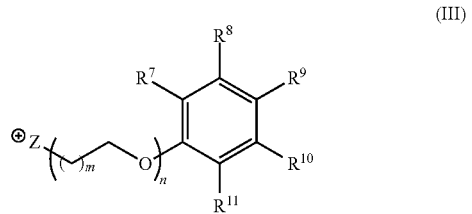

(III)

wherein each of $R^7$, $R^8$, $R^9$, $R^{10}$, and $R^{11}$ are the same or different and are selected from the group consisting of hydrogen, optionally substituted alkyl, and —CH=CHAr, wherein Ar is an aryl group, provided at least one of $R^7$, $R^8$, $R^9$, $R^{10}$, and $R^{11}$ is —CH=CHAr, $Z^+$ is a cationic group, n is 1-100, and each m is independently 1 or 2. In some embodiments, Ar is phenyl. In some embodiments, for a compound of Formula (III), $Z^+$ is $N(R^{13})_3$, wherein each $R^{13}$ is independent selected from the group consisting of hydrogen, optionally substituted alkyl, or optionally substituted aryl.

In some embodiments, for a compound of Formula (I), (II), or (III), two of $R^7$, $R^8$, $R^9$, $R^{10}$, and $R^{11}$ are —CH=CHAr. In some embodiments, for a compound of Formula (I), (II), or (III), one of $R^7$, $R^8$, $R^9$, $R^{10}$, and $R^{11}$ is —CH=CHAr and each of the other groups is hydrogen. In some embodiments, for a compound of Formula (I), (II), or (III), two of $R^7$, $R^8$, $R^9$, $R^{10}$, and $R^{11}$ are —CH=CHAr and each of the other groups is hydrogen. In some embodiments, for a compound of Formula (I), (II), or (III), $R^7$ and $R^8$ are —CH=CHAr and $R^9$, $R^{10}$, and $R^{11}$ are each hydrogen. In some embodiments, for a compound of Formula (I), (II), or (III), three of $R^7$, $R^8$, $R^9$, $R^{10}$, and $R^{11}$ are —CH=CHAr and each of the other groups is hydrogen. In some embodiments, for a compound of Formula (I), (II), or (III), $R^7$, $R^8$, and $R^9$ are —CH=CHAr and $R^{10}$ and $R^{11}$ are each hydrogen. In embodiments, for a compound of Formula (I), (II), or (III), Ar is phenyl. In some embodiments, for a compound of Formula (I), (II), or (III), each m is 1. In some embodiments, for a compound of Formula (I), (II), or (III), each m is 2. In some embodiments, for a compound of Formula (I), (II), or (III), n is 6-100, or 1-50, or 6-50, or 6-25, or 1-25, or 5-50, or 5-25, or 5-20.

Zwitterionic and Amphoteric Surfactants

In some embodiments, a microemulsion comprises a zwitterionic or amphoteric surfactant. In some embodiments, a microemulsion comprises a surfactant that is an amine oxide (e.g. dodecyldimethylamine oxide). In some embodiments, the surfactant is amphoteric or zwitterionic, including sultaines (e.g. cocamidopropyl hydroxysultaine), betaines (e.g. cocamidopropyl betaine), or phosphates (e.g. lecithin).

Alcohols

In some embodiments, a microemulsion further comprises an alcohol. The alcohol may also be a freezing point depression agent for the microemulsion. That is, the alcohol may lower the freezing point of the microemulsion.

In some embodiments, a microemulsion comprises from 1 wt % to 50 wt %, from 1 wt % to 40 wt %, from 1 wt % to 35 wt %, or from 1 wt % to 30 wt % alcohol of the total weight of the microemulsion composition. In some embodiments, a microemulsion comprises from 5 wt % to 40 wt %, from 5 wt % to 35 wt % or from 10 wt % to 30 wt % alcohol of the total weight of the microemulsion composition.

In some embodiments, the alcohol is selected from primary, secondary, and tertiary alcohols having from 1 to 4 carbon atoms. In some embodiments, the alcohol comprises methanol, ethanol, isopropanol, n-propanol, n-butanol, i-butanol, sec-butanol, iso-butanol, t-butanol, or combinations thereof.

Co-Solvent

In some embodiments, the microemulsion further comprises a co-solvent. The co-solvent may serve as a coupling agent between the solvent and the surfactant and/or may aid in the stabilization of the microemulsion.

In some embodiments, a microemulsion comprises from 1 wt % to 50 wt %, from 1 wt % to 40 wt %, from 1 wt % to 35 wt %, or from 1 wt % to 30 wt % co-solvent of the total weight of the microemulsion composition. In some embodiments, a microemulsion comprises from 5 wt % to 40 wt %, from 5 wt % to 35 wt % or from 10 wt % to 30 wt % co-solvent of the total weight of the microemulsion composition.

In some embodiments, the co-solvent comprises ethylene glycol, propylene glycol, dipropylene glycol monomethyl ether, triethylene glycol, ethylene glycol monobutyl ether, or combinations thereof.

Clay Control Additive

The well treatment composition comprises a clay control additive. The clay control additive comprises water and a clay control compound. In some embodiments, the clay control additive comprises from 5 wt % to 30 wt %, from 10 wt % to 25 wt %, from 15 wt % to 20 wt %, from 20 wt % to 25 wt %, or from 20 wt % to 30 wt %, versus the total weight of the well treatment composition.

Water

In some embodiments, the water is from about 30 wt % to about 90 wt %, about 35 wt % to about 85 wt %, about 40 wt % to about 80 wt %, about 45 wt % to about 75 wt %, about 50 wt % to about 70 wt %, about 55 wt % to about 65 wt %, or about 60 wt %, of the total weight of the clay control additive.

Clay Control Compound

In some embodiments, the clay control compound comprises a cationic polymer, a small molecule quaternary amine, a salt, or combinations thereof. In some embodiments, the clay control additive comprises a mixture (also known as a blend) of two or more types of clay control compounds.

Examples of cationic polymers comprise polyquaternary amines having a molecular weight of less than 5,000 atomic mass units (amu) and polyquaternary ammonium resins having a molecular weight of less than 5,000 amu. Examples of cationic polyquaternary amines comprise polydimethyldiallyl ammonium chloride and polyquaternary ammonium resins. Examples of small molecule quaternary amines comprise choline chloride and tetramethylammonium chloride. Examples of the salts comprise sodium chloride (NaCl), potassium chloride (KCl), calcium chloride ($CaCl_2$), magnesium chloride ($MgCl_2$), ammonium chloride ($NH_4Cl$), or combinations thereof.

In some embodiments, the salt comprises about 1 wt % to about 10 wt %, about 2 wt % to about 9 wt %, about 3 wt % to about 8 wt %, about 4 wt % to about 7 wt %, or about 5 wt % to about 6 wt %, of the total weight of the clay control additive.

In some embodiment, the clay control additive may further comprise a glycol. Examples of glycols comprise ethylene glycol, propylene glycol, dipropylene glycol monomethyl ether, triethylene glycol, ethylene glycol monobutyl ether, or combinations thereof.

In some embodiments, the clay control compound comprises from about 10 wt % to about 70 wt % of the total weight of the clay control additive. In some embodiments, the clay control compound comprises from about 15 wt % to about 65 wt %, about 20 wt % to about 60 wt %, about 25 wt % to about 55 wt %, about 30 wt % to about 50 wt %, about 30 wt % to about 40 wt %, about 35 wt % to about 45 wt %, or about 40 wt % of the total weight of the clay control additive.

In some embodiments, the well treatment composition comprises the microemulsion from about 75 wt % to about 90 wt % versus the total weight of the well treatment composition. In some embodiments, the well treatment composition comprises the clay control additive from about 10 wt % to about 25 wt % versus the total weight of the well treatment composition.

Methods of Using Well Treatment Composition

The well treatment composition described herein may be used in various methods of treating an oil and/or gas well for clay control protection, during the life cycle of the well, including, but not limited to drilling, hydraulic fracturing, stimulation, enhanced oil recovery (EOR) operations, improved oil recovery (IOR) operations, acidizing, wellbore clean outs, and water flooding applications.

The synergistic effects of (1) enhanced clay swelling protection; and (2) enhanced persistency—in using a combination of a certain microemulsion and a certain clay control additive to form a well treatment composition, has not been known in the industry. The well treatment composition can reduce up to four times less, up to three times less, or up to two times less concentration of clay control additive needed when compared to the same clay control additive used alone (i.e. well treatment composition without the microemulsion), to achieve the same, a similar, or a higher degree of performance of reducing clay swelling and while also providing for a more persistent clay control treatment. The advantage of having to use less concentration of clay control additives in the well helps substantially reduce the operator's costs in purchasing less clay control additives and also produces less damage to the subterranean formation.

First, a microemulsion composition is provided, comprising an aqueous phase, a surfactant, and a solvent. Next, a clay control additive is provided, comprising water and a clay control compound. The microemulsion and clay control additive are added, mixed, or combined on the fly with a carrier fluid to form a well treatment composition. In some embodiments, additional additives may be mixed or combined on the fly with the well treatment composition.

In certain cases, the microemulsion and/or the clay control additive components may be added with a carrier fluid, to form the well treatment composition, and then injected or delivered to the subterranean formation of an oil/and or gas well. A carrier fluid may act to deliver one of either the microemulsion or the clay control additive components (or both) to a well site in order to minimize clay swelling at or near the fracturing site. In certain cases, the carrier fluid is an aqueous-based fluid. Non-limiting examples of suitable carrier fluids include water, fresh water, formation water, produced water and fracturing water. In some cases, the carrier fluid may be a brine, which is water comprising various salts at various salinities.

The microemulsion and clay control additive components of the well treatment composition may be formed at a variety of suitable concentrations. In some embodiments, the microemulsion may be used or dosed at a microemulsion concentration from 0.5 gpt to 4.0 gpt of carrier fluid (gallons of microemulsion per thousand gallons of carrier fluid), from 1.0 gpt to 3.5 gpt of carrier fluid, from 1.5 gpt to 3.0 gpt of carrier fluid, or from 2.0 gpt to 2.5 gpt of carrier fluid. In certain embodiments, the microemulsion may be used or dosed at a microemulsion concentration of 0.5 gpt of carrier fluid, 0.75 gpt of carrier fluid 1.0 gpt of carrier, 1.25 gpt of carrier fluid, 1.5 gpt of carrier fluid, 1.75 gpt of carrier fluid, 2.0 gpt of carrier fluid, 2.25 gpt of carrier fluid, 2.5 gpt of carrier fluid, 2.75 gpt of carrier fluid, 3.0 gpt of carrier fluid, 3.25 gpt of carrier fluid, 3.5 gpt of carrier fluid, 3.75 gpt of carrier fluid, or 4.0 gpt of carrier fluid.

In some embodiments, the clay control additive may be used or dosed at a clay control additive concentration from 0.25 gpt to 2.0 gpt of carrier fluid (gallons of clay control additive per thousand gallons of carrier fluid), from 0.5 gpt to 1.75 gpt of carrier fluid, from 0.75 gpt to 1.5 gpt of carrier fluid, or from 1.0 gpt to 1.25 gpt of carrier fluid. In certain embodiments, the clay control additive may be used or dosed at a clay control additive concentration of 0.25 gpt of carrier fluid, 0.5 gpt of carrier fluid, 0.75 gpt of carrier fluid, 1.0 gpt of carrier fluid, 1.25 gpt of carrier fluid, 1.5 gpt of carrier fluid, 1.75 gpt of carrier fluid, or 2.0 gpt of carrier fluid.

The choice of suitable concentrations or doses is not limited by the delivery capabilities of any given pump or any delivery method.

The well treatment composition is injected (i.e. pumped) at high pressure downhole into the oil and/or gas well using pumping equipment. The well treatment composition comes into contact with the subterranean formation of the reservoir, where clay or clay minerals may be present. The well treatment composition binds to the clay or clay mineral surfaces to enhance clay swelling protection (i.e. substantially reduce or prevent clay swelling), while also enhancing persistency in providing continued clay control protection at enhancing clay swelling protection.

In some embodiments, the clay control additive concentration of the well treatment composition is up to four times less when compared to a concentration of the clay control additive alone when injected into the subterranean formation to achieve the same, a similar, or a higher degree of the reducing swelling of the swelling clay. As described herein, one significant advantage of using the well treatment composition is the cost savings. During the life cycle of oil and/or gas wells, well treatment operations are incredibly expensive, wherein treating one well can cost an operator millions of dollars. The high expense is due, in part, to the cost of various chemical additives used to treat the wells, including microemulsions and clay control additives. However, with the well treatment composition described herein, an operator is able to save cost, because the clay control additive component of the well treatment composition, can be used up to four times less, up to three times less, or up to two times less concentration of the same clay control additive, while achieving the same, a similar, or a higher degree of performance when compared to using the clay control additive alone (i.e. use of the well treatment composition without the microemulsion) and also having more persistency in provided continued clay swelling protection. The ability for an operator to spend up to four times less, up to three times less, up to two times less money on clay control additives, results in significant cost savings. In addition, the well treatment composition produces less damage to the subterranean formation, because less clay control additives are used to treat the well.

Furthermore, not only does the operator save up to four times, up to three times, or up to two times in cost on clay control additive expenditures, the operator may also enjoy the benefits of the same, a similar, or a higher degree of performance in reducing or preventing clay swelling (e.g. of swelling clays) and greater persistency in reducing or preventing clay swelling (e.g. of swelling clays). By having greater persistency, the well treatment composition remains persistent at continuing to reduce or prevent clay swelling because it is resistant to being washed off of the surfaces of the subterranean formation (e.g during flowback).

Any suitable method for injecting or pumping the well treatment composition into a wellbore may be employed. For example, in some embodiments, the well treatment composition may be injected into a subterranean formation (e.g. a reservoir) by injecting it into a well or wellbore in the zone of interest of the subterranean formation and thereafter pressurizing it into the formation for a selected distance. Methods for achieving the placement of a selected quantity of a mixture in a subterranean formation are known in the art. The well may be treated with the well treatment composition for a suitable period of time. The well treatment composition and/or other fluids may later be removed from the well using known techniques, including producing the well.

It should be understood, that in embodiments where the well treatment composition is said to be injected into a wellbore, the well treatment composition may be diluted and/or combined with other liquid component(s) prior to and/or during injection (e.g., via straight tubing or via coiled tubing, etc.) to form a well treatment fluid. For example, in some embodiments, the well treatment composition is added to or diluted with an aqueous carrier fluid (e.g., water, brine, sea water, fresh water, produced water, reverse osmosis water, or a well-treatment fluid, such as an acid, a fracturing fluid comprising polymers, produced water, treated water sand, slickwater, etc.) prior to and/or during injection of the well treatment composition into the wellbore.

In some embodiments, the carrier fluid may comprise a brine. Brine is an aqueous solution having total dissolved solids (TDS). As used herein, TDS means the amount of total dissolved solid substances, for example salts, in the carrier fluid. Furthermore, TDS typically defines the ion composition of the carrier fluid. The TDS is measured in parts per million (ppm).

EXAMPLES

The following examples are intended to illustrate certain embodiments of the present invention, but do not exemplify the full scope of the invention.

All measurements provided in the following examples were performed using a capillary suction timer (CST). Capillary suction time (CST) tests measure the relative flow capacity of a slurry of ground formation rock used to form an artificial core.

First, 5 g of a 70 mesh grind was placed in 50 ml test fluid and stirred on a magnetic stirrer for 1 hour. Five ml of a slurry of ground formation rock was placed in a cylindrical "mold" setting on top of the chromatography paper. The fluid in the slurry was pulled by capillary pressure into the chromatography paper. A sensor starts the timer when the fluid reaches 0.25 in. away from the mold and stops when it reaches 1 in. A rock formation sample with dispersible or swelling clays will have a longer CST time, while the one without clay (or other fine particles), would have a shorter CST time. Thus, CST tests can be used to study the relative sensitivity of a rock sample to various fluids. The CST ratio varies from 0.5 (no sensitivity) to upwards of 50 (extreme sensitivity).

CST ratio is equal to $[CST_{sample} - CST_{blank}]/CST_{blank}]$, where $CST_{sample}$ is the time in seconds of the fluid with the rock formation sample and $CST_{bank}$ is the time in seconds of the fluid without the rock formation sample.

The higher the CST ratio, indicates a lower performing clay control additive to prevent clay swelling. The lower the CST ratio, indicates a higher performing clay control additive.

Example 1

CST measurements were performed using Well Treatment 1, comprising 0.5 gpt of clay control 1 (CC1) and 2 gpt of microemulsion 1 (ME1) to minimize clay swelling tendencies. ME1 comprises between about 10 wt % and about 30 wt % surfactant, about 10 wt % and about 60 wt % aqueous phase (e.g. water), and between about 1 wt % and about 20 wt % solvent, versus the total weight of ME1. The surfactant in ME1 comprises benzyl coco alkylbis (hydroxyethyl) chloride ethoxylated alcohol. CC1 comprises between about 20 wt % and about 60 wt % polyquaternary amine polymer, between about 2 wt % and about 10 wt % sodium chloride salt, about 50 wt % aqueous phase (water), of the total weight of CC1. Example 1 used a model system composition comprising 17 wt % bentonite (montmorillonite) and 83 wt % silica flour, versus the total weight of the model system composition, and shale cuttings from the Niobrara formation of the Southern Powder River Basin containing 39.6 wt % mixed layers of smectite and illite, versus the total weight of the shale cuttings.

TABLE 1

|  | CST ratio | |
| --- | --- | --- |
|  | Model system composition | Shale cuttings |
| Well Treatment 1 0.5 gpt CC1 and 2 gpt ME1 | 0.8 | 1.4 |
| 2 gpt of ME1 | 22.5 | 2.7 |
| 2 gpt of CC1 | 1.17 | 3.3 |

Table 1 shows the CST ratio measured for Well Treatment 1 (0.5 gpt CC1 and 2 gpt ME1), 2 gpt of ME1, 2 gpt of CC1, and 0.5 gpt of CC1, when each is used to treat a model system composition and used to treat shale cuttings.

As shown in Table 1, with respect to the model system composition that was treated by Well Treatment 1, which has a concentration of CC1 (0.5 gpt) that is four times less than the concentration of CC1 used alone (2 gpt), exhibited a lower CST ratio (i.e. 0.8) compared to the CST ratio of CC1 when used alone (i.e. 1.17).

As shown in Table 1, with respect to the shale cuttings that were treated by Well Treatment 1, which has a concentration of CC1 (0.5 gpt) that is four times less than the concentration of CC1 used alone (2 gpt), exhibited a lower CST ratio (i.e. 1.4) compared to the CST ratio of CC1 when used alone (i.e. 3.3).

Table 1 shows that the right combination of clay control additive and microemulsion can significantly increase clay swelling protection and reduce the amount of clay control needed (e.g. by up to four times less) for optimal protection for both the model system composition and the shale cuttings.

Example 2

CST measurements were performed using Well Treatment 2, comprising 0.5 gpt clay control 2 (CC2) and 2 gpt microemulsion 2 (ME2) to reduce or prevent clay swelling tendencies. ME2 comprises between about 10 wt % and about 30 wt % surfactant, between about 10 wt % and about 60 wt % aqueous phase (e.g. water) and between about 1 wt % and about 10 wt % solvent (non-aqueous phase), versus the total weight of ME2. The surfactant in ME2 was a mixture comprising about 5 wt % to about 20 wt % of cationic quaternary ammonium and about 5 wt % to about 10 wt % of ethoxylated alcohol.

CC2 comprises between about 2 wt % to about 15 wt % cocohydroxyethyl benzyl quaternary amine and between about 10 wt % to about 20 wt % polyquaternary amine, and about 50 wt % aqueous phase (water), versus the total weight of CC2. Example 2 used a model system composition comprising 17 wt % bentonite (montmorillonite) and 83 wt % silica flour, versus the total weight of the model system composition.

TABLE 2

|  | CST ratio |
| --- | --- |
| Well Treatment 2 0.5 gpt CC2 and 2 gpt ME2 | 22.16 |
| 2 gpt of CC2 | 8.8 |
| 2 gpt of ME2 | 43 |

Table 2 shows the CST ratio measured for Well Treatment 2 (0.5 gpt CC2 and 2 gpt ME2), 2 gpt of CC2, and 2 gpt of ME2.

As shown in Table 2, using 2 gpt of CC2 showed better performance than using a combination of 0.5 gpt CC2 and 2 gpt ME2 in preventing clay swelling. In fact, the CST ratio measured for 2 gpt CC2 (i.e. 8.8) was much lower than the one measured for 0.5 gpt CC2 and 2 gpt of ME2 (i.e. 22.16). This data shows that not any combination of microemulsion and clay control additive will exhibit a synergistic effect of the microemulsion and the clay control additive, resulting in the use of less clay control additive-only the combination of certain clay control additives and certain microemulsions will enhance clay swelling protection for the type of rock formation being treated.

Example 3

Example 3, Table 3 and FIG. 1, show the persistency of clay swelling protection provided by Well Treatment 3 (0.5 gpt CC1 and 2 gpt ME3) compared to CC1 alone and also shows the persistency of clay swelling protection provided by Well Treatment 4 (0.5 gpt CC3 and 2 gpt ME3) compared to CC3 alone, in reducing or preventing clay swelling after several washes using 500 ppm TDS brine.

A model system composition comprising 17 wt % bentonite (e.g. a swelling clay) and 83 wt % silica flour, versus the total weight of the model system composition, was mixed with 500 ppm TDS brine. The CST ratio was measured and plotted for the model system composition (See FIG. 1, Brine).

CST measurements were performed using Well Treatment 4, comprising 0.5 gpt clay control 3 (CC3) and 2 gpt microemulsion 3 (ME3) to reduce or prevent clay swelling tendencies. ME3 comprises between comprises between about 15 wt % and about 30 wt % surfactant, about 10 wt % and about 50 wt % aqueous phase (e.g. water), and between about 5 wt % and about 20 wt % solvent, versus the total weight of ME3. The surfactant in ME3 comprises a mixture from about 5 wt % to about 15 wt % nonionic ethoxylated alcohol, from about 5 wt % to about 15 wt % alkoxylated polyimine, and about 5 wt % to about 10 wt % of tristyrylphenol ethoxylate. Clay control 3 (CC3) comprises between about 30 wt % and about 50 wt % polyquaternary ammonium resin, between about 1 wt % and about 10 wt % sodium chloride (NaCl), and about 40 wt % to about 70 w % of aqueous phase (water), versus the total weight of CC3.

Upon addition of 0.5 gpt of clay control additive CC1 (from Example 1) or CC3, a swelling reversal was observed (i.e. lowering of the CST ratio). CC1 and CC3 were each removed and replaced by the brine (wash) and the persistency of the clay swelling treatment to provide reduction in clay swelling was observed after seven successive washes using the same brine as they occurred over time.

As shown in Table 3 and FIG. 1 below, Well Treatment 3 (Example 3) showed a lower CST ratio (i.e. 0.67) compared to using CC1 alone (i.e. 1.9) and CC3 alone (i.e. 2.1) after treatment. After seven washes using brine, the CST ratio for Well Treatment 3 remained constant. However, after only two washes of brine on CC1 or CC3, the CST ratio started increasing, which suggests that the CC1 or CC3 was slowly being removed from the rock formation sample. This data suggests that Well Treatment 3 has a higher persistency in treating swelling clay (i.e. reducing clay swelling) compared to CC1 alone or CC3 alone.

As shown in Table 3 and FIG. 1 below, Well Treatment 4 (Example 3) showed a lower CST ratio (i.e. 0.24) compared to using CC1 alone (i.e. 1.9) and CC3 alone (i.e. 2.1) after treatment. After seven washes using brine, the CST ratio for Well Treatment 4 remained virtually constant. However, after only two washes of brine on CC1 or CC3, the CST ratio started increasing, which suggests that the CC1 or CC3 was slowly being removed from the rock formation sample. This data suggests that Well Treatment 4 provided for a higher persistency in treating swelling clay (i.e. reducing clay swelling) compared to CC1 alone or CC3 alone.

TABLE 3

|  | Brine | 0.5 gpt CC1 | 0.5 gpt CC3 | Well Treatment 3 (0.5 gpt CC1 and 2 gpt ME3) | Well Treatment 4 (0.5 gpt CC3 and 2 gpt ME3) |
| --- | --- | --- | --- | --- | --- |
| Untreated | 8.2 | | | | |
| Treated | 8.5 | 1.9 | 2.1 | 0.67 | 0.24 |
| Wash 1 | 8.9 | 2.2 | 2.1 | 0.71 | 0.32 |
| Wash 2 | 9 | 2.3 | 2.4 | 0.7 | 0.35 |
| Wash 3 | 9.1 | 3.2 | 3 | 0.67 | 0.47 |
| Wash 4 | 9.3 | 3.3 | 3.1 | 0.66 | 0.47 |
| Wash 5 | 9.5 | 3.6 | 3.8 | 0.68 | 0.56 |
| Wash 6 | 9.8 | 3.8 | 3.9 | 0.78 | 0.63 |
| Wash 7 | 9.9 | 3.8 | 4 | 0.81 | 0.68 |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of treating a subterranean formation of an oil and/or gas well using a well treatment composition for clay control treatment, comprising the steps of:
  delivering a microemulsion to the subterranean formation, wherein the microemulsion comprises an aqueous phase from 10 wt % to 50 wt %, versus the total weight of the microemulsion; a cationic surfactant from 10 wt % to 40 wt %, versus the total weight of the microemulsion; and a solvent from 5 wt % to 25 wt %, versus the total weight of the microemulsion, wherein the solvent is a terpene solvent;
  delivering a clay control additive to the subterranean formation, wherein the clay control additive comprises water from 30 wt % to 90 wt %, versus the total weight of the clay control additive; a clay control compound from 10 wt % to 70 wt %, versus the total weight of the clay control additive, wherein the clay control compound comprises a cationic polymer, and wherein the cationic polymer comprises a polyquaternary ammonium resin having a molecular weight of less than 5,000 amu;
  delivering a carrier fluid to the subterranean formation;
  combining the microemulsion, clay control additive, and carrier fluid during injection into the subterranean formation to form the well treatment composition, wherein the microemulsion is from 75 wt % to 90 wt % of the total weight of the well treatment composition excluding the carrier fluid, wherein the clay control additive is from 10 wt % to 25 wt % of the total weight of the well treatment composition excluding the carrier fluid, wherein the microemulsion concentration is from 0.5 gpt to 4.0 gpt of the carrier fluid, and wherein the clay control additive concentration is from 0.25 gpt to 2.0 gpt of the carrier fluid; and
  reducing swelling of a swelling clay.

2. The method of claim 1, wherein the injecting the well treatment composition into the subterranean formation enhances persistency of the clay control treatment in the reducing swelling of the swelling clay.

3. The method of claim 1, wherein the method achieves the same or a higher degree of the reduced swelling of the swelling clay compared to an equivalent method without the microemulsion, including with up to four times lower clay control additive concentration in the well treatment composition of the method compared to the equivalent method.

4. The method of claim 1, wherein the method achieves the same or a higher degree of the reduced swelling of the swelling clay compared to an equivalent method without the microemulsion, and also produces less damage to the subterranean formation.

5. The method of claim 1, wherein the microemulsion concentration is 2.0 gpt of the carrier fluid.

6. The method of claim 1, wherein the clay control additive concentration is 0.5 gpt of the carrier fluid.

7. The method of claim 1, wherein the cationic surfactant comprises a cocohydroxyethyl benzyl quaternary amine.

8. The method of claim 1, wherein the terpene solvent comprises d-limonene, nopol, alpha terpineol, eucalyptol, dipentene, linalool, pinene, alpha-pinene, beta-pinene, alpha-terpinene, or combinations thereof.

9. The method of claim 1, wherein the microemulsion comprises a second surfactant comprising a nonionic surfactant.

10. The method of claim 9, wherein the second surfactant comprises a $C_{12}$-$C_{15}$ $E_7$ alcohol ethoxylate, a tristyrylphenol ethoxylate, an alkoxylated polyimine, or combinations thereof.

11. A method of treating a subterranean formation of an oil and/or gas well using a well treatment composition for clay control treatment, comprising the steps of:
  delivering a microemulsion to the subterranean formation, wherein the microemulsion comprises an aqueous phase from 10 wt % to 50 wt %, versus the total weight of the microemulsion; a nonionic surfactant from 10 wt % to 40 wt %, versus the total weight of the microemulsion; and a solvent from 5 wt % to 25 wt %, versus the total weight of the microemulsion, wherein the solvent is a terpene solvent; and
  delivering a clay control additive to the subterranean formation, wherein the clay control additive comprises water from 30 wt % to 90 wt %, versus the total weight of the clay control additive; a clay control compound from 10 wt % to 70 wt %, versus the total weight of the clay control additive, wherein the clay control compound comprises a cationic polymer, wherein the cationic polymer comprises a polyquaternary ammonium resin having a molecular weight of less than 5,000 amu;
  delivering a carrier fluid to the subterranean formation;
  combining the microemulsion, clay control additive, and carrier fluid during injection into the subterranean formation to form the well treatment composition, wherein the microemulsion is from 75 wt % to 90 wt % of the total weight of the well treatment composition excluding the carrier fluid, wherein the clay control additive is from 10 wt % to 25 wt % of the total weight of the well treatment composition excluding the carrier fluid, wherein the microemulsion concentration is from 0.5 gpt to 4.0 gpt of the carrier fluid and the clay control additive concentration is from 0.25 gpt to 2.0 gpt of the carrier fluid, and
  reducing swelling of a swelling clay.

12. The method of claim 11, wherein the injecting the well treatment composition into the subterranean formation enhances persistency of the clay control treatment in the reducing swelling of the swelling clay.

13. The method of claim 11, wherein the method achieves the same or a higher degree of the reduced swelling of a swelling clay compared to an equivalent method without the microemulsion, including with up to four times lower clay control additive concentration in the combination of the carrier fluid and well treatment composition of the method compared to the equivalent method.

14. The method of claim 11, wherein the method achieves the same or a higher degree of the reduced swelling of a swelling clay compared to an equivalent method without the microemulsion, and also damage to the subterranean formation.

15. The method of claim 11, wherein the microemulsion concentration is 2.0 gpt of the carrier fluid.

16. The method of claim 11, wherein the clay control additive concentration is 0.5 gpt of the carrier fluid.

17. The method of claim 11, wherein the nonionic surfactant comprises a $C_{12}$-$C_{15}$ $E_7$ alcohol ethoxylate, a tristyrylphenol ethoxylate, an alkoxylated polyimine, or combinations thereof.

18. The method of claim 11, wherein the terpene solvent comprises d-limonene, nopol, alpha terpineol, eucalyptol, dipentene, linalool, pinene, alpha-pinene, beta-pinene, alpha-terpinene, or combinations thereof.

19. The method of claim 11, wherein the microemulsion comprises a second surfactant comprising a cationic surfactant.

20. The method of claim 19, wherein the cationic surfactant comprises a cocohydroxyethyl benzyl quaternary amine.

* * * * *

UNITED STATES PATENT AND TRADEMARK OFFICE
CERTIFICATE OF CORRECTION

PATENT NO. : 11,104,843 B2  
APPLICATION NO. : 16/598989  
DATED : August 31, 2021  
INVENTOR(S) : Siwar Trabelsi Page 1 of 1

It is certified that error appears in the above-identified patent and that said Letters Patent is hereby corrected as shown below:

In the Claims

Column 34, Claim 11, Line 26, the word "substerranean" should be "subterranean"

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*